United States Patent
Dwivedi et al.

(10) Patent No.: US 10,810,732 B2
(45) Date of Patent: *Oct. 20, 2020

(54) SCREEN DAMAGE DETECTION FOR DEVICES

(71) Applicant: Hyla, Inc., Farmers Branch, TX (US)

(72) Inventors: Rajiv Kumar Dwivedi, Bartlett, IL (US); Christopher Heistad, Cedar Falls, IA (US); Bikramjit Singh, Carlsbad, CA (US); Karl Felix Medina, Oceanside, CA (US); Ram Mohan Reddy, Irving, TX (US); Jonathan Brian Chinn, Arcadia, CA (US); Rebekah Jane Griffiths, North Tustin, CA (US); Satish G. Nair, Naperville, IL (US); Biju Nair, Long Grove, IL (US)

(73) Assignee: Hyla, Inc., Farmers Branch, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,583

(22) Filed: May 7, 2019

(65) Prior Publication Data

US 2019/0266720 A1   Aug. 29, 2019

Related U.S. Application Data

(63) Continuation of application No. 15/452,707, filed on Mar. 7, 2017, now Pat. No. 10,332,249.
(Continued)

(51) Int. Cl.
*G06F 3/00* (2006.01)
*G06T 7/00* (2017.01)
(Continued)

(52) U.S. Cl.
CPC .............. *G06T 7/0008* (2013.01); *G06F 3/00* (2013.01); *G06F 3/0346* (2013.01); *G06F 11/00* (2013.01);
(Continued)

(58) Field of Classification Search
CPC ........... H04N 7/18; G06T 7/0008; G06T 7/11; G06T 7/004; G06T 2207/20084;
(Continued)

(56) References Cited

U.S. PATENT DOCUMENTS 5,717,780 A   2/1998   Mitsumune et al.
9,703,325 B2 *  7/2017   Pope ..................... G06F 1/1656
(Continued)

FOREIGN PATENT DOCUMENTS

JP   2009032112 A   2/2009
JP   2013114049 A   6/2013
(Continued)

OTHER PUBLICATIONS

Examination Report in related Canadian Application No. 3016367 dated Jul. 12, 2019 (4 pages).

*Primary Examiner* — Trang U Tran
(74) *Attorney, Agent, or Firm* — Ferguson Braswell Fraser Kubasta PC

(57) ABSTRACT

In various implementations, a condition of one or more screens of a device may be determined. A user may select a return application that facilitates capturing image(s) of device screen(s). A user may capture images of a screen of using a camera of the same device or another device. In some implementations, the user may position the device proximate a mirror such that the device can capture an image of one or more screens of the device. The captured image(s) may be processed and/or analyzed to determine if the screen of the device is damaged. In some implementations, notifi-
(Continued)

cations based on the condition of the device screen(s) may be transmitted. A price for the device may be determined, in some implementations based on the condition of the screen.

27 Claims, 15 Drawing Sheets

Related U.S. Application Data

(60) Provisional application No. 62/304,729, filed on Mar. 7, 2016.

(51) Int. Cl.
| | | |
|---|---|---|
| *G06F 11/00* | (2006.01) | |
| *G06Q 50/00* | (2012.01) | |
| *G06F 3/0346* | (2013.01) | |
| *G06T 7/11* | (2017.01) | |
| *G06T 7/13* | (2017.01) | |
| *G06Q 30/02* | (2012.01) | |

(52) U.S. Cl.
CPC ......... *G06Q 30/0278* (2013.01); *G06Q 50/00* (2013.01); *G06T 7/0004* (2013.01); *G06T 7/11* (2017.01); *G06T 7/13* (2017.01); *G06T 2207/20084* (2013.01); *G06T 2207/30164* (2013.01); *G06T 2207/30204* (2013.01)

(58) Field of Classification Search
CPC ........... G06T 2207/30164; G06T 2207/30204; G06Q 30/0278
USPC .......................... 715/716; 348/125; 705/306
See application file for complete search history.

(56) References Cited

U.S. PATENT DOCUMENTS

| | | |
|---|---|---|
| 10,001,878 B2 | 6/2018 | Wood et al. |
| 2006/0120588 A1 | 6/2006 | Kwon et al. |
| 2010/0053604 A1 | 3/2010 | Rice |
| 2013/0144797 A1 | 6/2013 | Bowles et al. |
| 2013/0154842 A1* | 6/2013 | Chishima .............. G06F 3/0416 340/665 |
| 2014/0253494 A1 | 9/2014 | Jiang et al. |
| 2015/0116481 A1 | 4/2015 | Troy et al. |
| 2016/0019685 A1 | 1/2016 | Nguyen |
| 2017/0056928 A1 | 3/2017 | Torrione |

FOREIGN PATENT DOCUMENTS

| | | |
|---|---|---|
| JP | 2013531823 A | 8/2013 |
| JP | 2015513135 A | 4/2015 |

* cited by examiner

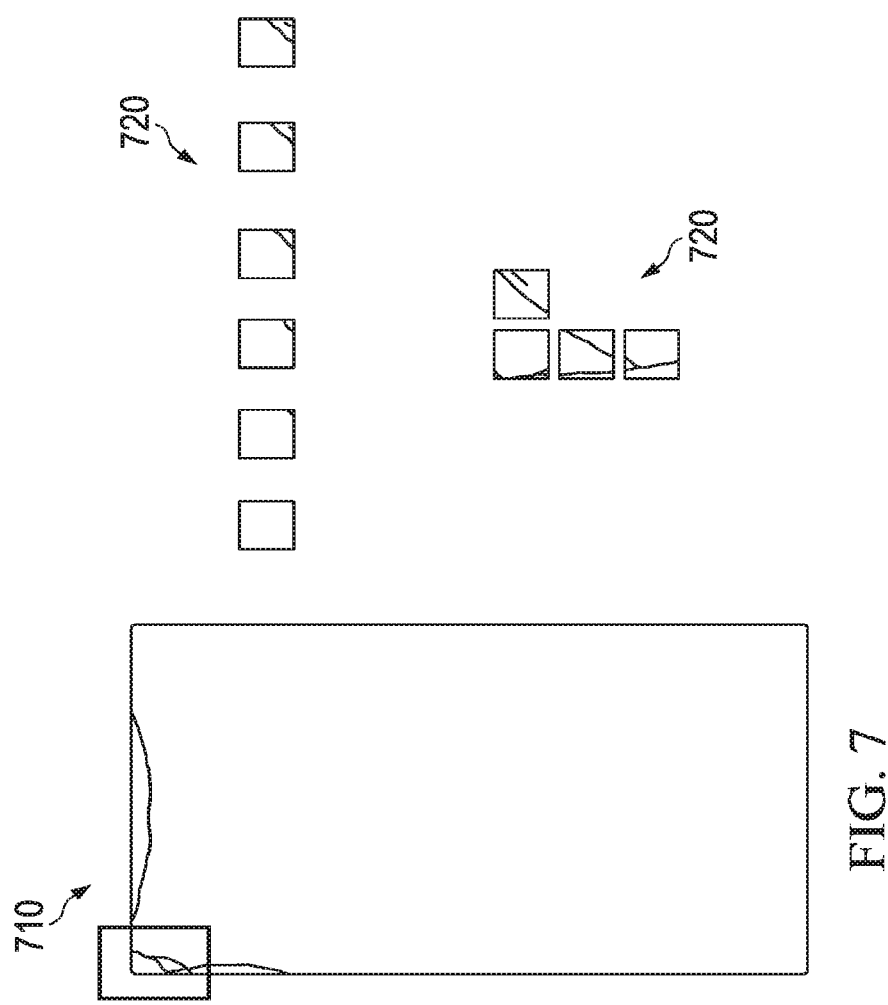

SCREEN DAMAGE DETECTION FOR DEVICES

CROSS-REFERENCE TO RELATED APPLICATIONS

The present application is a continuation application of and, thereby, claims benefit under 35 U.S.C. § 120 to U.S. patent application Ser. No. 15/452,707, entitled, "SCREEN DAMAGE DETECTION FOR DEVICES," filed on Mar. 7, 2017, having the same inventors, and incorporated herein by reference in its entirety. U.S. patent application Ser. No. 15/452,707 claims priority under 35 U.S.C. § 119(e) to U.S. Provisional Patent Application No. 62/304,729, entitled "SCREEN DAMAGE DETECTION FOR MOBILE DEVICES", and filed on Mar. 7, 2016, which is hereby incorporated by reference in its entirety.

TECHNICAL FIELD

The present invention relates to determining a condition of one or more device screens.

BACKGROUND

Devices, such as smart phones, watches, and tablets, are often sold back to manufacturers or third parties when consumers upgrade their devices. These used devices may have value on the resale market based on the condition of the device. For example, a user may offer his used phone to a reseller and the reseller may evaluate the condition of the phone and offer a price based on the evaluation. However, the evaluation of the condition of the device is often performed by a human and thus, slow and subjective. In addition, the user must wait (e.g., at a kiosk, store, etc.) on the evaluation to receive the offer price, which may decrease the incentive for users to resell their used devices and/or decrease user satisfaction with the process.

SUMMARY

In various implementations, a condition of one or more screens on a device is determined (e.g., whether damage to the screen exists). A user may request an evaluation of a condition of a screen and/or a device via a return application on the device. The return application may determine the condition of a device (e.g., for value determination, resale, insurance claims, warranty claims). The return application may display a first graphic on the screen of the device and prompt the user to position the device in front of a reflective surface, such as a mirror (e.g., to allow an image of the reflection of the device in the mirror to be captured by the device itself). The return application may guide the user to position the device in a predetermined position (e.g., closer to the mirror) to increase the probability that an image is captured that can be used to accurately assess the condition of the screen. An image of the screen of the device may be obtained (e.g., an image may be automatically taken and/or taken by the user). For example, a picture of the reflection of the screen in the mirror may be captured. The image of the screen may be processed and/or analyzed and a determination of whether the screen is damaged may be made based on the analyzed image. One or more notifications and/or flags may be generated, transmitted, and/or displayed based on the analysis of the screen damage.

In some implementations, a second device may be utilized to facilitate identification of a condition of a screen of a device. For example, a first device may have a broken and/or damaged camera and/or the screen of the first device may be too badly damaged to allow interaction with the return application on the first device (e.g., screen cracks may harm user fingers). Thus, the return application on a second device may be utilized to identify a condition of a screen of a first device.

In various implementations, a condition of one or more screens of a device (e.g., electronic such as a mobile device, laptop, etc.) may be identified. A request for evaluation of a condition of a screen of a first device or portion thereof may be received via a return application on the first device. Presentation of a first graphic, which includes a first identification code, on the screen (e.g., display component) of the first device may be allowed. The return application may cause the first graphic to be displayed on the screen of the first device. At least a portion of a first image of the first graphic may be captured by a camera of the first device. The first image may include a reflection of the first graphic on a reflective surface, such as a mirror. Presentation of one or more second graphics may be allowed (e.g., via the return application) on the screen of the first device, and at least a portion of one or more of second images of at least one of the second graphics may be captured (e.g., via a camera of the first device). One or more of the second images may include a reflection of at least one of the second graphics on the reflective surface, such as a mirror. The return application may be capable of controlling and/or allowing the user to control the camera component of the first device. The return application may have access to the images captured by the camera of the first device. One or more of the second images may be processed to determine a condition of the screen of the first device. Processing the second image(s) may include dividing the second image into parts, determining whether one or more of the parts of the second image include damage, and identifying parts adjacent to one or more of the parts that include damage. A condition of the screen of the first device may be determined based on whether one or more of the parts of one or more of the second images are determined to include damage and whether one or more of the parts adjacent to one of the parts determined to include damage also includes damage.

Implementations may include one or more of the following features. An identity of a first device may be verified based on an analysis of the first identification code. The second captured image that includes the second graphic may be embedded or otherwise tagged with the first identification code or portion thereof, from the first graphic. Capturing at least a portion of the second image(s) of the second graphic(s) may include determining an orientation of the device based on the captured image of the first graphic, and providing guidance to adjust an orientation of the device based on the determined orientation. At least a portion of an additional image of the first graphic may be captured via the camera of the first device. In some implementations, an orientation of the device may be determined based on the captured image of the first graphic, and guidance may be provided to adjust an orientation of the device based on the determined orientation. At least a portion of additional image(s) of the second graphic(s) may be captured via the camera of the first device, wherein each of the additional images comprises a reflection of at least one of the second graphics on the reflective surface. If it is determined that the captured first image(s) and/or the captured second image(s) is not a processable image, the first device may be allowed to be reoriented to capture a processable image. To capture the processable image, in some implementations, an orientation of the device may be determined based on the captured first image or one or more of the captured second images, and guidance may be provided to adjust an orientation of the device based on the determined orientation. The captured second image(s) may be tagged with at least a portion of the captured first image. In some implementations, one or more processes of the first device may be restricted (e.g., pop-ups, alerts, banners, etc.), for example, while the image is being captured and/or the return application is in operation. Identifying a screen or portion thereof of the first device in the second image may include utilizing corner detection and/or edge detection to identify a screen of the first device in the second image. Processing one of the second images may include identifying the screen or portion thereof of the first device in the second image and generating a third image in which portions of the second image that are not identified as a screen or portion thereof in the second image are restricted from inclusion in the third image. The third image may be divided into parts (e.g., rather than and/or in addition to the second image) and a determination may be made whether one or more of the parts of the third image include damage. Parts adjacent to one or more of the parts that include or do not include damage may be identified. Determining a condition of the screen of the first device may be based on whether one or more of the parts of one or more of the third images are determined to include damage and whether one or more of the parts adjacent to one of the parts determined to include damage includes damage. Generating a third image may include altering the second image such that portions of the second image that are not identified as the screen or portion thereof are removed. Identifying a screen or portion thereof may include identifying the active area of the screen of the first device.

In various implementations, a condition of screen(s) of a device (e.g., electronic device such as a mobile device) may be identified. For example, a condition of a first device may be identified using a second device. At least one of the first device or second device may include a camera (e.g., external image capturing component). The first and the second device may or may not be the same device. A request for evaluation of a condition of a screen of a first device or portion thereof may be received via a return application on a second device. The first device may include the return application. Presentation of a first graphic, which includes a first identification code, may be allowed on the screen of the first device via the return application on the first device. At least a portion of the first graphic presented on the first device may be captured via a camera of the second device. Presentation of one or more second graphics on the screen of the first device may be allowed, and at least a portion of the second graphic(s) presented on the first device may be captured via a camera of the second device. One or more of the second images may be processed (e.g., pre-processed and/or processed) to determine a condition of the screen of the first device. Processing a second image may include dividing the second image into parts and determining whether one or more of the parts of the second image include damage. In some implementations, neural networks may perform operations of the return application, such as processing of images. Parts adjacent to one or more of the parts that include damage may be identified. The adjacent parts may or may not have damage. A condition of the screen of the first device may be determined based on whether one or more of the parts of the second image are determined to include damage and whether one or more of the adjacent parts includes damage.

In various implementations, if a determination is made that the condition first device is damaged, damage information may be determined. Flags may be generated to identify one or more of the parts of the second image that are determined to include damage based on the damage information. The touchscreen of the first device may be tested (e.g., according to known touchscreen tests) if a determination is made that the condition of the first device is damaged. The brightness of the screen of the first device may be calibrated based on the captured first image (e.g., to facilitate image processing and/or accuracy). Allowing presentation of second graphics on the screen of the first device may include allowing presentation of a set of burst images on the first device. The set of burst images includes at least one of the second graphics at multiple luminosity levels. Capturing at least a portion of one or more of the second graphics presented on the first device may include capturing the set of burst images presented on the first device, and selecting one of the captured burst images by determining which of the captured set of burst images is most similar in color to a reference color. The selected captured burst image may be identified as one of the captured second graphics (e.g., for pre-processing and/or processing). Capturing at least a portion of one or more of second images of at least one of the second graphics may include determining an orientation of the device based on the captured image of the first graphic, and providing guidance to adjust an orientation of the device based on the determined orientation. At least a portion of an additional image of the first graphic may be captured via the camera of the first device. Allowing presentation of one or more second graphics on the screen of the first device may include allowing sequential presentation of more than one second graphic on the screen of the first device. Capturing at least a portion of one or more of the second graphics may include capturing at least one image of each of the second graphics sequentially presented on the screen of the first device. Allowing presentation of one or more second graphics on the screen of the first device may include allowing concurrent presentation of more than one second graphic on the screen of the first device.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 7 illustrates an implementation of a portion of a division of an image.

Like reference symbols in the various drawings indicate like elements.

DETAILED DESCRIPTION

In various implementations, a device (e.g., electronic device such as smart phone, watch, tablet, e-reader, laptop, portable game console, etc.) may be evaluated for a condition of one or more screens of the device. The device may include a component capable of taking external images such as a camera (e.g., as opposed to component capable of saving images of graphical user interfaces displayed on the screen such as a screenshot).

The condition of the screen may impact aesthetics and/or usability (e.g., since a crack may require repair prior to use and/or may or may not impact use and/or viewing on a device), and thus may alter the price of a device when offered for sale. Human evaluations may cause variability since evaluations may be subjective. Human evaluations may cause a lag time between when a user offers a device for sale and when a price for the device is offered. These factors may decrease the desire of a user to resell the device, decrease user satisfaction with the process, which may keep good devices off the market, increase resale prices (e.g., since the supply is more limited), and/or decrease recycling of devices (e.g., since the device may be stored or thrown away). In some implementations, an automated determination of the screen condition may reduce fraud. For example, a screen condition may be verified for insurance purposes (e.g., policy issuance and/or claim) and/or reuse. By automatically determining the screen condition as described, the incidence of fraud may be reduce, which may reduce policy costs (e.g., since a condition can be verified and/or may be objectively determined) and/or increase user satisfaction (e.g., since device may not need to be taken to a store front to verify condition and/or since an objective condition of the device may be obtained for a possible reuse). Thus, there is a need for automatic detection of a condition of device or components thereof, such as whether screen damage exists on a device.

Figure 1:
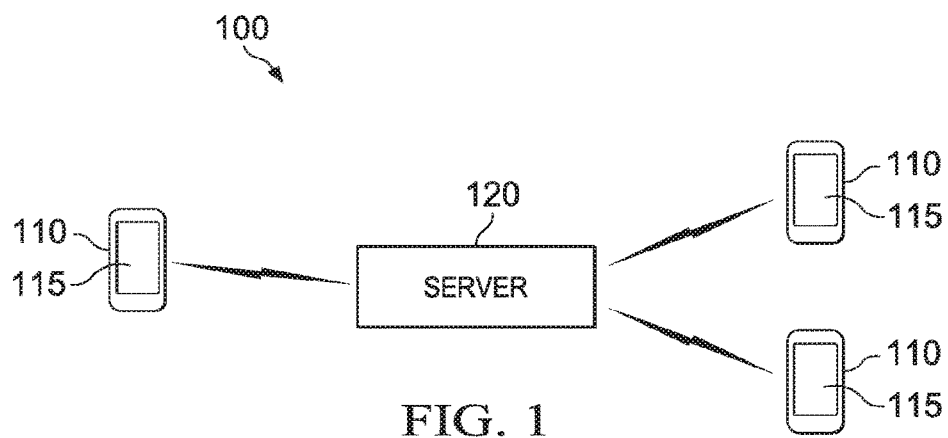
FIG. 1 illustrates an implementation of an example system.

As illustrated in FIG. 1, one or more devices 110 may be coupled (e.g., via a network such as the Internet or other communication network) to a server 120. The server 120 may be any appropriate server. In some implementations, the server 120 may include a neural network. The neural network may be implemented via software and/or hardware (e.g., some implementations of a neural network may be commercially available and/or built from IBM®, CogniMem®, via the FANN library, and/or using a convolutional neural network on top of the Google® tensorflow framework) on the server. In some implementations, a convolutional neural network may be utilized since a convolutional neural network may be more capable (e.g., faster, more accurate, etc.) of image processing than other neural networks, in some implementations.

The neural network may self-adjust and/or adjust based on updates to the system to improve accuracy of screen damage detection, in some implementations. For example, learning tools, such as captured images and/or marked damage (e.g., captured images in which the parts identified as damaged are flagged by for example color and/or pattern changes), may be provided to the neural network to facilitate and/or to allow the neural network to further learn to identify a condition of a device. The neural network may analyze learning tools, associated captured images, process the associated captured images, identify damage via the processing, and/or identify differences and/or similarities between the parts with the identified damages and the learning tools to develop the neural network (e.g., such that the neural network is capable of identifying conditions of devices or portions thereof). In some implementations, the neural network may formulate its own learning on perceived damage to pixels and/or other portions of the device (e.g., based on learning tools provided to the neural network and/or processing of captured images).

The devices 110 may include one or more device screens 115 (e.g., monitor, LCD screen, glass, gorilla glass, etc.). The devices 110 may include a camera capable of capturing a reflection of an image of the device screen (e.g., a front facing camera or camera on the same side of the device as the device screen). A device 110 may include a return application stored on a memory of the device and executable by the processor of the device. The return application may allow the device 110 to communicate with the server 120. The return application may receive input from the user, prompt the user to provide input and/or position the device, transmit images and/or notifications, generate graphics, capture images, direct a component of the device such as a camera to capture an image, restrict components of the device (e.g., flash), restrict operations of the device (e.g., pop-ups, banners, alerts, reminders, etc. during operation of the return application and/or image capture) and/or communicate with other devices, such as the server 120. In some implementations, the return application may allow sale of the device via the application, determine a condition of the device or components thereof, allow a value of a device to be determined based on a condition of the device, determine a condition of the device or components thereof for reuse of the device, determine a condition of the device or components thereof for insurance claims (e.g., if a user wants to submit a claim for a device insurance policy, the return application may determine the condition of the device or components thereof), determine a condition of a device for warranty claims, etc.

The server and device 110 may perform one or more of the described operations separately and/or in conjunction with other devices. In some implementations, a server may not be utilized and the return application may perform one or more of the described operations (e.g., rather than the server). In some implementations, a server may perform one or more operations of the described processes to increase speed of the operation. In some implementations, one or more of the devices 110 and/or the server may perform one or more of the operations in conjunction with each other. In some implementations, the server may be cloud based and the device(s) may communicate with the server to perform operations such as image processing and/or analysis (e.g., identification of conditions).

In some implementations, when a user decides to sell a device (e.g., when upgrading a device, when switching devices, etc.), a user may select the return application on the device. The return application may determine information (e.g., condition of device, properties of the device such as model, market resale prices, etc.) about the device and display a price for the device. The condition of the screen may adjust the price offered for the device via the application since screen damage is aesthetically unpleasing to some users, can indicate damage to other components, and/or can be expensive to replace and/or repair. Since the screen condition may be determined automatically, by the application and/or server, the evaluation be made more quickly and/or more consistency may be provided (e.g., since a human is not determining the condition). Also, since the screen condition may be determined automatically, a user may be less able to intentionally report the screen condition inaccurately (e.g., since the value of a device with good screen condition means a higher market price, the user has an incentive to report screen condition to be good even if it is cracked or broken; automatic detection may inhibit fraud common in self-reporting and/or human based analysis systems). In addition, the screen condition (e.g., large crack, deep crack, etc.) may prompt the system to determine whether other components of the device may also be damaged. Once the condition of the device screen and/or the device is determined, a price to offer for the device may be determined (e.g., by the server and/or the return application). In some implementations, a base cost for the device may be determined (e.g., based at least partially on resell price, recycling price, market information, supply of similar devices, and/or demand for the device) and the base price may be adjusted based on the condition of the device (e.g., decrease for damage to screen, decrease for damage to other components, and/or increase for new in box). The user may then make a decision regarding whether or not to sell the device based on the received price. The entity offering the price may make the offer with the knowledge of the screen condition without significant time lags between the user beginning the process for resale and receiving a price. Thus, satisfaction with the process may be increased for users and/or entities purchasing or validating claims or insurability of used devices, in some implementations.

In some implementations, in addition to and/or instead of for resale, the condition of the device may be determined (e.g., by the return application and/or server) for an insurance claim (e.g., device insurance). For example, a device may be damaged and/or suspected of being damaged. The condition of the device or components thereof may be determined and/or reported to file and/or verify an insurance claim. In some implementations, the return application may be utilized to determine a condition of a device or portion thereof when purchasing device insurance. Thus, rather than relying on self-reporting of and/or taking a device to a physical store to determine a condition of a device or components thereof, the condition may be determined via the return application on the device.

In some implementations, the condition of a device may be determined (e.g., by the return application and/or server) for device warranties. For example, a manufacturer, reseller, repairer, and/or refurbisher may warrant a device. Warranties may be complex, and a user may have difficulty understanding which parts are covered and/or what type of damage is covered. The condition of a device and/or components thereof and/or a determination of whether the damaged component is under warranty may be determined using the return application. In some implementations, a warranty claim may be submitted and/or verified using the condition determined via the return application.

In some implementations, the condition of a device may be determined to determine whether a device can be reused (e.g., by another user). For example, a second user may be able to obtain a condition of the device of a first user via the return application on the device (e.g., the return application may send an notification with condition of the device to the second user). The second user may then obtain an evaluation of the condition of the device with less worry about fraud, subjectivity, or error (e.g., than a human evaluation). The device with and/or without damage may be used by the second user (e.g., with or without repairing the damage identified by the system). The return application may be used to identify which repairs may be performed and/or whether a device may be used without repairs.

Figure 2:
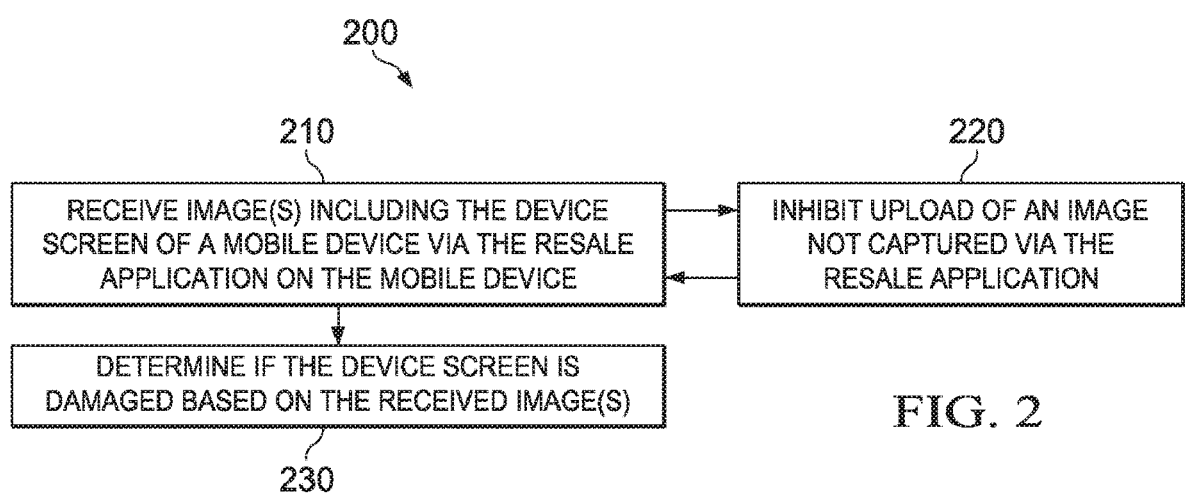
FIG. 2 illustrates an implementation of an example process for determining a condition of a screen of a device.

FIG. 2 illustrates an implementation of an example process 200 for determining a condition of a screen of a device. Image(s) of the device screen of a device may be received via the return application on the device (operation 210). For example, a user may open the return application on a device. In some implementations, the return application may initiate communications with the server (e.g., to obtain recent base prices for devices, to obtain software updates, etc.). The user may request an offer for a price of the device, to determine if a device can be reused, to file an insurance claim, to verify a device condition for an insurance claim and/or policy, and/or other appropriate reasons for determining a condition of a device. The return application may prompt (e.g., via visual, audio, and/or tactile notifications) the user to obtain an image of the device screen. For example, the return application may prompt the user to position the device with the device screen facing a mirror. Since the quality of the image may affect the ability to determine a condition of the device screen (e.g., whether the device screen is or is not damaged), the return application may prompt the user to adjust the position of the device. For example, the return application may prompt (e.g., via visual and/or auditory notifications) the user with instructions to adjust the position of the device, such as to move the device closer, farther away, tap the image to refocus the image, adjust the angle at which the device is held, etc. When the device is in a predetermined position, one or more images may be captured. The image may be automatically captured after the return application determines that the device is in the predetermined position (e.g., an optimum position for capturing an image). The return application may detect the device within the image and automatically focus the camera on the device. Additional, the return application may also crop the device within the image. The image captured may be the reflection of the device in the mirror and may include the device screen. The reflection of the device in the mirror may be captured rather than using a "screen capture" function of the device to obtain an image of the exterior of the screen rather than an image of the interface presented on the device screen.

In some implementations, upload of an image to the server and/or return application that is not captured via the return application may be inhibited (operation 220). When screen image condition is determined based on an image, the potential for fraud may exist. For example, a user may take an image of a similar device without damage to increase a price offered for a damaged device. To reduce costs associated with fraudulent or incomplete/erroneous representation of device screen(s), uploads or selections of images not captured via the return application may not be accepted. For example, the return application may process images that are captured by the application (e.g., the application accesses the camera application on the device and processes the image taken by the camera application and tag the captured image with device information such as identification, date and/or timestamp). The return application may not accept images from a photo library of the device or cloud storage (e.g., the user may not be allowed to take an image of the device screen and select the image from a photo library on the device).

A determination may be made whether the device screen is damaged based on the received image(s) (operation 230). The return application may transmit the received image(s) to the server for analysis. The server may process and/or analyze the image(s) to determine if the device screen is damaged. For example, the server may include an neural network that has been trained to identify damaged screens and/or probabilities that screens or portions thereof are damaged. In some implementations, the neural network may be trained to identify damaged screens by processing a set of images including screens with known cracks, breaks, and/or other damage and/or images without damage. The neural network may learn to identify patterns associated with screen damage from the set of images. The server may determine whether the device screen is damaged based on the analysis of the received image(s) by the neural network, which has been trained to recognize screen damage. The neural network (e.g., residing on the server) may have, for example, a first or an outer layer that may be trained to identify typical screen images that are not associated with damage, such as reflection(s), logo(s), shadow(s), and/or other artifact(s) which may be found on an image of a device (e.g., pre-processing). Training the outer layer neural network to identify typical screen images that are not associated with damage may reduce the occurrence of incorrect assessments of either damage (e.g., cracks, chips, scratches) being present when they are actually not on the device and/or increase the correct assessments of damage. In addition, training the outer layer of the neural network to identify typical screen images that are not associated with damage may allow recapture of the image of the screen (e.g., to obtain more accurate processing of the image for damage).

Process 200 may be implemented by various systems, such as system 100. In addition, various operations may be added, deleted, and/or modified. For example, the return application may perform one or more of the operations in determining whether a device screen is damaged. The return application may perform at least a portion of the analysis of the image, for example. In some implementations, more than one image may be captured and processed to determine if the screen of the device is damaged. In some implementations, a base cost for the device may be adjusted if a determination is made that the screen of the device is damaged. For example, if a device screen is damaged the base cost may be reduced by the screen replacement cost, screen repair cost, processing time costs, and/or labor costs.

In some implementations, the return application (e.g., on the server and/or device) may pre-process the image. For example, the return application may identify poor quality images (e.g., poor quality) captured (e.g., one or more of the images captured via the return application). The return application may pre-process images (e.g., via the outer layer of the neural network and/or via the return application on the user device) to identify the poor images (e.g., via an outside classifier on a neural network that is set up and trained to detect conditions that may 'hide' a crack and/or defects). For example, the pre-processing may identify (e.g., via the outside classifier) poor quality details, such as including fingers and/or other obstructions over screen, an object in image is not a phone, a full screen not in the image, and/or reflections that might hide a crack. In some implementations, the outside layer on the neural network may (e.g., via training) identify other defects that cause poor images. In some implementations, the pre-processing may filter images based at least partially on other factors that can be calculated by analyzing the image, such as blurriness and/or bad color. Blurriness, associated with poor image quality, may be calculated based on the rate of change of colors on edges to determine whether the image is in focused or not in focus. Bad coloring in the image, which may be associated with poor image quality, may be detected by examining color intensity.

In some implementations, the condition of a first device may be determined using a second device (e.g., a different device than the first device). For example, a first screen of a first device may be damaged such that a user may not be capable of using the device or may not desired to use the device (e.g., fingers may be harmed by cracks in screen, chips from screen are loose, screen may be further damaged by use, etc.). Thus, a second device may be utilized to capture the images of the first device. The first and the second device may include the return application (e.g., one or more operations of the return application may be performed by processors of the first device and second device). A request for evaluation of a condition of a screen of a first device or portion thereof via a return application on a second device may be received. The return applications on the first and second devices may be in communication (e.g., directly and/or indirectly via the return application on the server). For example, the return application on the second device may communicate with the return application on the first device to allow graphics to be presented on the screen of the first device via the return application. The return application may present images (e.g., including first and/or second graphics) on the first device and allow the presented images to be captured by the second device. The captured images may be pre-processed and/or processed to determine a condition of the screen of the first device. Thus, although a first device may be restricted from use (e.g., due to damage), an appraisal of the condition of the first device screen may be obtained.

In some implementations, a device may automatically adjust the position of the device. A device may be capable of balancing on an approximately level surface, and so the device may be disposed on the surface in front of a mirror. The device may automatically trigger one or more vibrations to automatically reposition (e.g., rotate) the device. In some implementations, if the automatic adjustment fails to position the device in a predetermined position for image capture, the return application may prompt via notification(s) (e.g., audio, tactile, and/or visual) the user to adjust the position.

Notification(s) may transmit instructions to a user on how to reposition the device (e.g., more closer, move farther away, etc.), in some implementations. In some implementations, the return application may generate a positioning aid for display on the device. The positioning aid may indicate (e.g., visual, auditory, and/or via tactile signals) whether the device is in a predetermined position, how close the device is to the predetermined position, and/or in which direction the device is in and/or out of position. For example, the positioning aid may include an electronically generated bubble level (e.g., accelerometers in the device; and/or GPS may facilitate determining the orientation of the device, may calculate where in an image the device is detected; and/or may provide real-time feedback of changes in position(s) and/or angle(s) at which the device is held). In some implementations, the instructions may include instructions on how to alter an environment (e.g., a room) in which the device is positioned. For example, instructions may include instructions to increase and/or decrease lighting, close window(s) (e.g., to reduce glare), and/or any other appropriate instructions.

In some implementations, the return application may facilitate capture of images using cues (e.g., audio, tactile, and/or visual). For example, a graphical user interface of the return application may give an impression of a "tunnel" in the graphical user interface (e.g., via 3D square formations). For example, the graphical user interface may generate the tunnel look with the identification code (e.g., QR code) at an end of the tunnel with size and/or shape matcher s to the requisite aligned squares. This may guide a user to align and position device at the correct angle and distance from the mirror. The return application may include other visual and/or audio cues. For example, a graphical user interface may include (e.g., via overlays, pop-ups, embedded images, etc.) arrows (e.g., 2D and/or 3D) pointing to direct a user to reorient the device (e.g., tilt side to side and/or up down, move the phone front and/or back).

In some implementations, a notification may be generated by the return application for display on the device when the image(s) are captured successfully. For example, a captured image may be pre-processed. In some implementations, if the image(s) are determined during pre-processing to not be proces sable (e.g., the server can not determine the screen condition for example because the image of the device was cut off and/or does not show the full screen), the user may receive one or more notifications and/or the user may be prompted to restart the process or portions thereof. The neural network of the return application may perform one or more of the pre-processing operations. For example, the neural network (e.g., an outer layer of a multi-layer neural network) may be capable (e.g., by training) of acting as a filter to reject images during pre-processing that have issues such as, but not limited to, fingers blocking the screen and/or light reflection of a window, etc. The neural network may be capable of providing a notification to the user that includes at least a portion of the reason that the captured image is of poor quality. This reason for the rejection may facilitate (e.g., for the user) the correction process (e.g., reducing the guess work by the user in determining the reason for the rejection of the captured image). In some implementations, the return application may prompt the user to initiate the resale process and/or automatically initiate the resale process upon opening of the return application.

In various implementations, to determine a condition of the screen, the return application may capture (e.g. automatically and/or manually with a selection from a user) image(s) of the device screen. The application may generate one or more graphics (e.g., a picture, a pattern, solid color display, and/or graphical user interface) for display on the device screen, in some implementations. Graphics generated by the return application may include one or more colors (e.g., black, white, green, purple, etc.), one or more patterns, a photograph, a picture, an identifier (e.g., QR code, bar code, etc.), any other appropriate graphic, and/or combinations thereof. The generation of the graphic may include retrieving a graphic from a memory (e.g., of the device and/or coupled to the device) and/or generating an identifier (e.g., based on device information such as IMEI information, user information, temporal information such as date/time, and/or validation of such information in real-time within defined thresholds to eliminate reuse of previously taken good device images or images of another device, etc.). Some graphics may facilitate detection of screen condition. For example, the graphic generated by the application may include a solid green, black, and/or white graphic that covers at least a portion of the display screen (e.g., the active portion of the display screen or portions thereof).

Figure 3A:
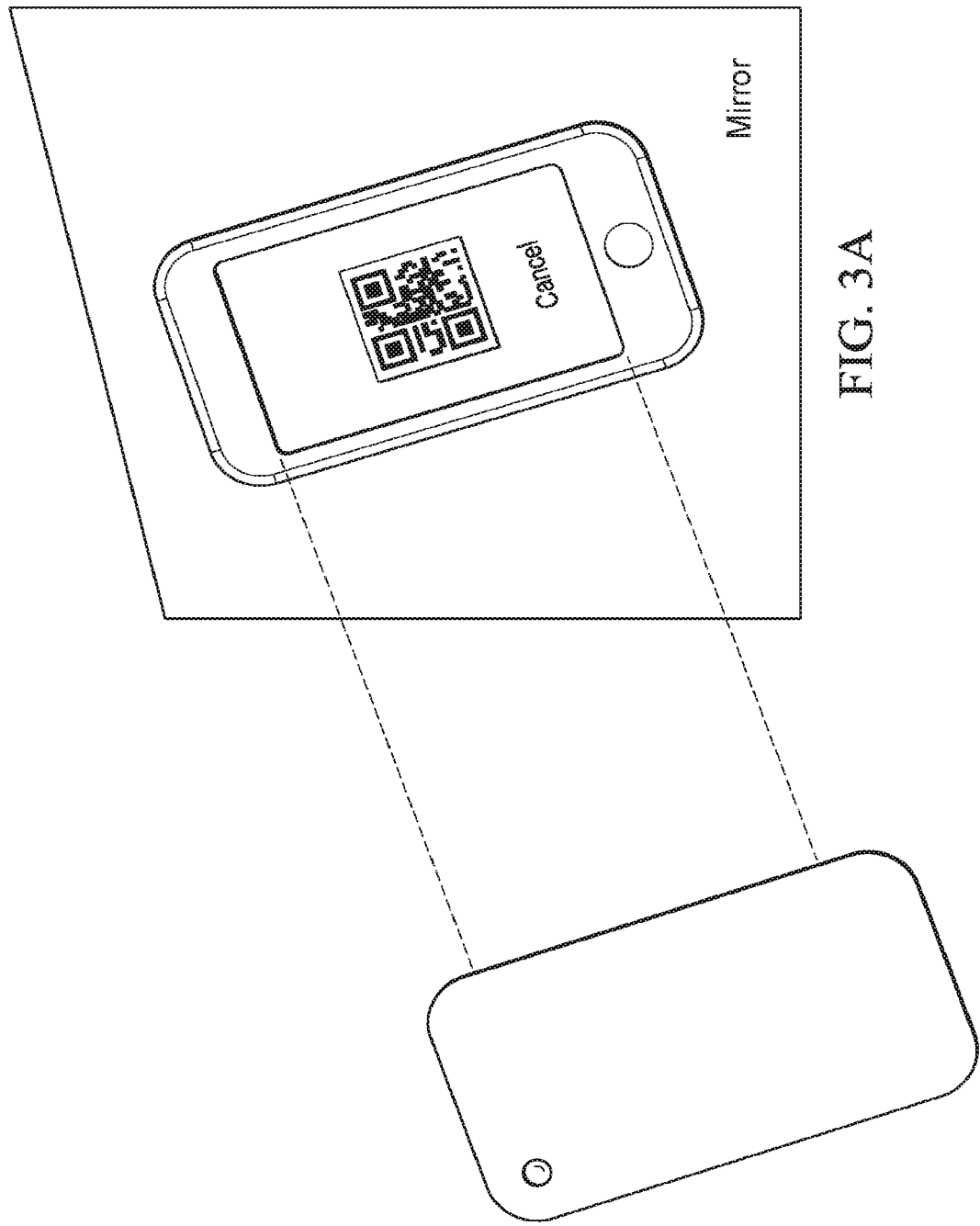
FIG. 3A illustrates an implementation of an example positioning of a device in front of a mirror.

In some implementations, the application may generate a first graphic that includes an identifier and one or more second graphics. The first graphic and/or second graphic(s) are analyzed to determine the device screen condition. For example, a first graphic may include an identifier such as a QR code. The identifier may be generated by the return application. For example, device information (e.g., IMEI information, device age, device model, memory capacity, etc.) and/or user information may be encoded in the identifier. FIG. 3A illustrates an example of positioning a device in front of a mirror, where the return application generates an identifier for display on the device screen. When the return application prompts the user to position the device such that the device screen is reflected in a mirror, the return application may generate the identifier for display on the device screen. The return application then may analyze the reflection of the identifier displayed in the mirror via the camera (e.g., a front facing camera of the device) to determine if the position of the device should be adjusted. For example, if the identifier is blurry in the reflection of the identifier in the mirror, the user may be notified and prompted to adjust the position of the device. In some implementations, once the device is in the appropriate position, the return application may or may not capture an image of the reflection of the device screen in the mirror that includes the identifier code. In some implementations, the return application and/or server may verify the QR code captured is associated with the device (e.g., the QR code may be decoded, compared with known device information, etc.).

Figure 3B:
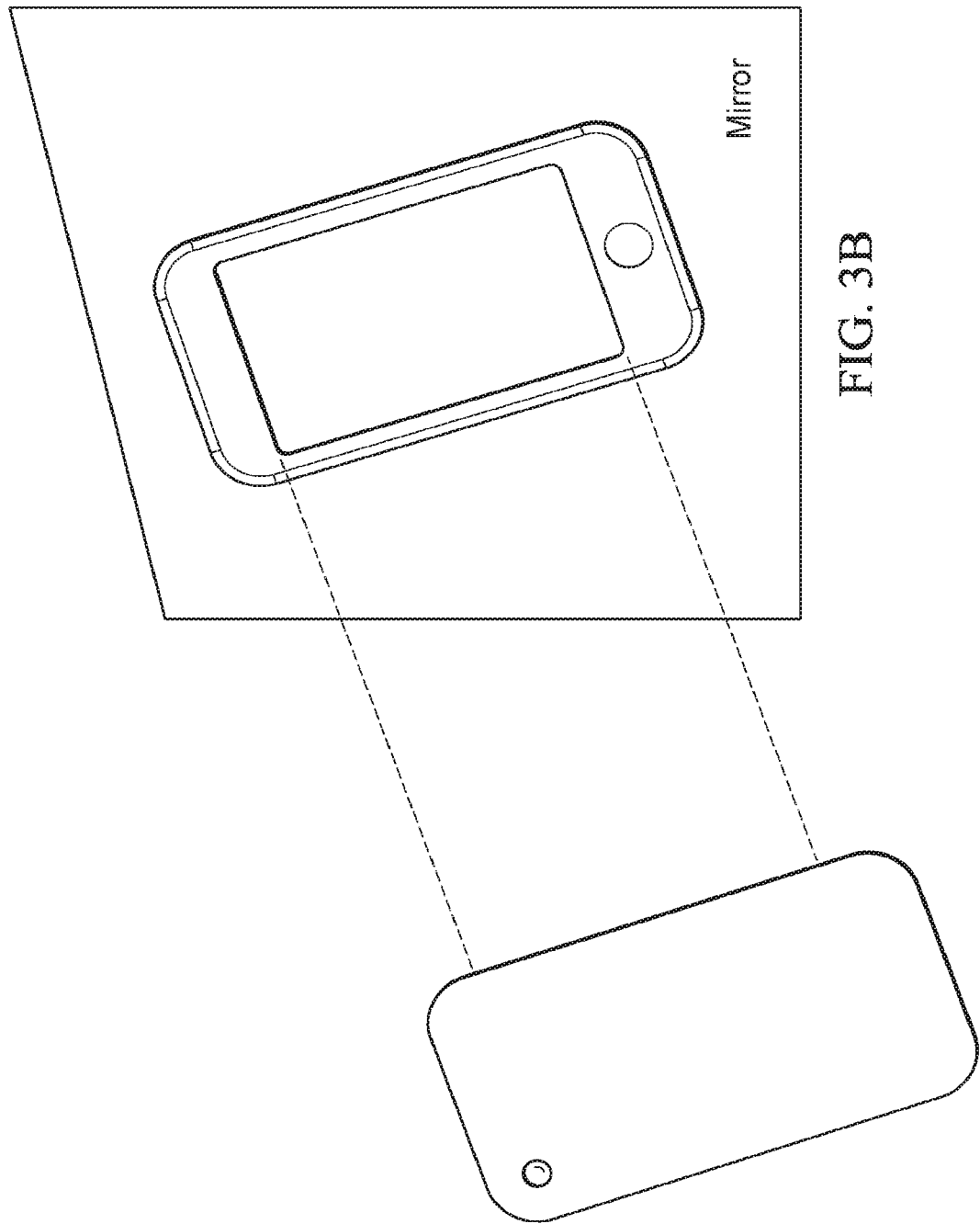
FIG. 3B illustrates an implementation of an example capture of an image including a device screen.
Figure 3C:
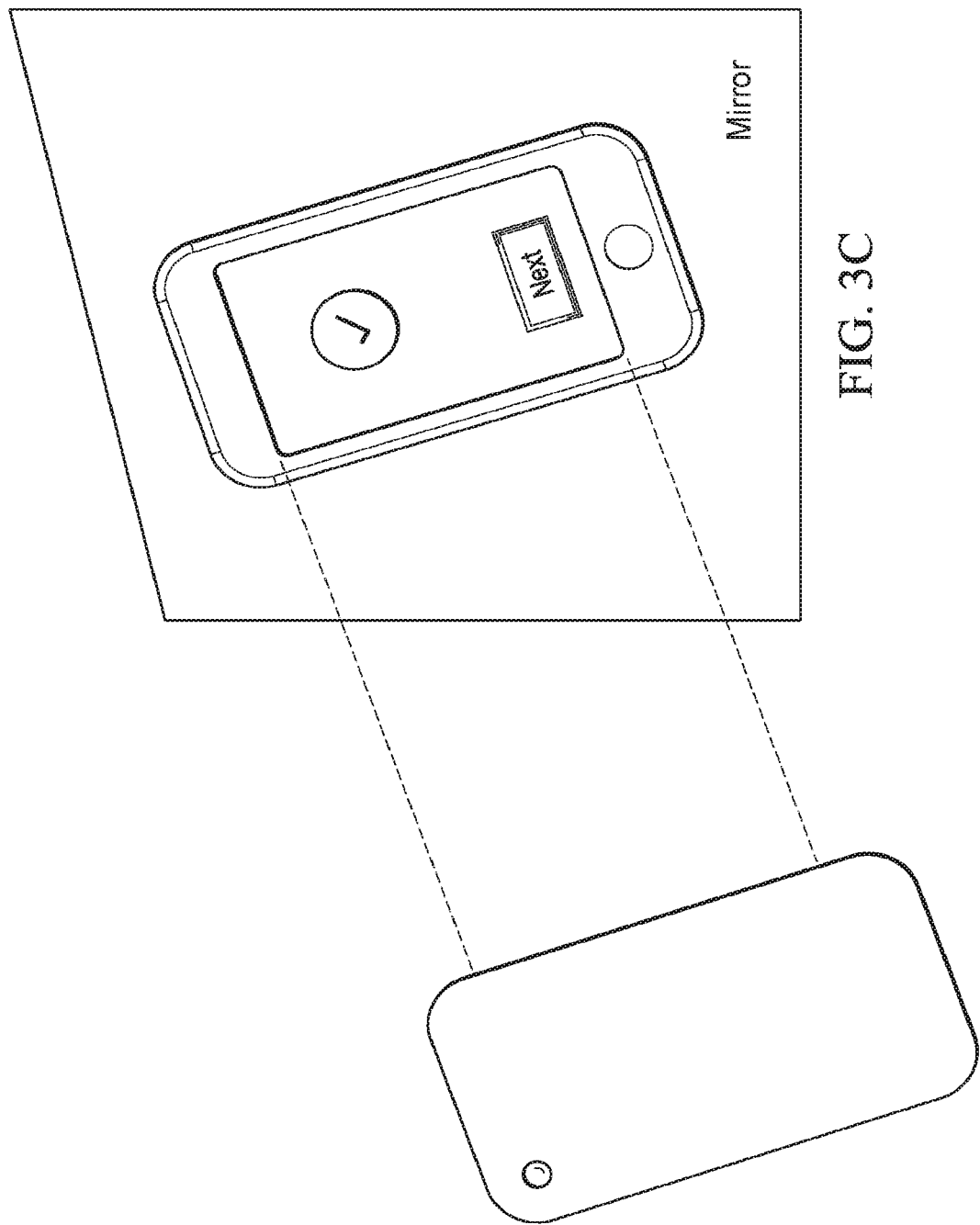
FIG. 3C illustrates an implementation of an example notification displayed by the return application.

The return application may then generate one or more second graphics (e.g., a green screen, a white screen, and/or other graphics) and allow the capture of the reflection of the second image(s) in the mirror. FIG. 3B illustrates an example of positioning a device in front of a mirror, where the return application on the device generates a second graphic. In some implementations, the return application may generate a notification when the capture of the image(s) is completed, as illustrated in FIG. 3C. The captured second image(s) may be analyzed to determine the condition of the screen. For example, the captured second image(s) may be transmitted to the server for analysis by the neural network on the server.

In some implementations, the return application may automatically generate a second graphic once the identifier code is in focus, has been captured and/or has been processed (e.g., verified). By utilizing a second graphic once the identifier code has been captured and/or validated, the condition of the device screen may be more easily identified, in some implementations. For example, detection of a screen condition may be more easily determined using a graphic that is easily identifiable by the neural network. In some implementations, the second graphic may be quickly generated immediately before capturing an image of the screen device (e.g., by photographing the reflection of the device screen) and/or for a short time period after the return application has determined that the device is in the appropriate position (e.g., the identifier is in focus on the captured image of the first graphic) to inhibit fraud. In some implementations, the second graphics may be generated sequentially to allow capture of associated second images sequentially. In some implementations, the capture of the images may be automated to coordinate graphic generation and image capture.

In some implementations, the first image may be captured and/or processed such that second images may be tagged (e.g., attached and/or encoded) with the first image, portions thereof, and/or a decoded identifier. The second image(s) may be captured prior to and/or subsequent to the first image, in some implementations. By tagging the second image(s) with the first image or portion thereof (e.g., information obtained by decoding the identifier), fraud may be reduced. For example, a user may be inhibited from uploading an image of a different device screen (e.g., a device screen not of the device) since an uploaded image may not include the encoded portion. In some implementations, the return application and/or server may be able to identify second images that are not tagged to identify fraudulent images of device screen(s).

The distance at which images are captured by the device may also be managed, in some implementations. For example, the focal length of the camera may be set by the application and the position of the device may be adjusted until the identifier graphic on the device screen is focused in the image obtained by the camera. In some implementations, the size of the identifier (e.g., QR code) in the image may determine the appropriate distance a user should position the device from the mirror. In some implementations, a corner angle detection may facilitate determination of whether the device is positioned in the predetermined position for image capture with respect to the angle at which the device is positioned proximate the mirror. For example, the predetermined position for image capture may include positioning the device parallel to the surface of the mirror and so the corner angle detection may identify the corner angles in the image and determine the angles at each corner to determine if the device was parallel to the surface of the mirror at the time of image capture.

In some implementations, the return application may adjust one or more components of the device to facilitate capture of a device screen image. For example, the return application may turn off flash (e.g., to avoid glare). As another example, the return application may block (e.g., temporarily) device notifications (e.g., banners, alerts, etc.) to allow an image of the graphic generated by the return application to be generated without additional graphical user interfaces and/or overlays.

Figure 4:
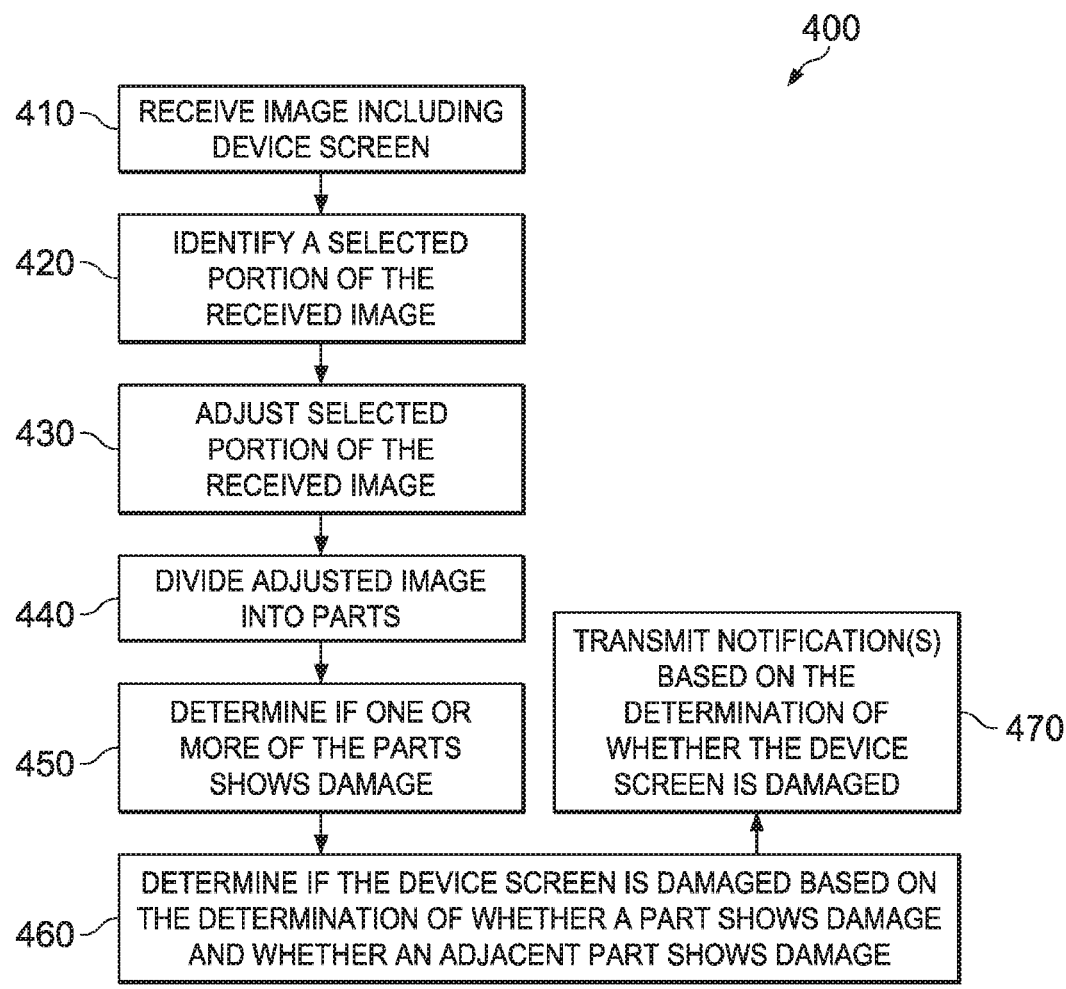
FIG. 4 illustrates an implementation of an example process for determining whether a device screen is damaged.

After image(s) are captured by the return application, one or more of the images may be analyzed to determine a condition of the device screen. For example, the image(s) to be analyzed may include the second graphic(s). FIG. 4 illustrates an implementation of an example process 400 for determining a condition of a device screen (e.g., determine if the screen is damaged). An image including a device screen may be received (operation 410). For example, the server may receive the image via the return application. The image may be automatically uploaded to the server and/or selected for upload by the user via the return application. The image may include one or more graphics generated by the return application and displayed on the device screen.

Figure 5B:
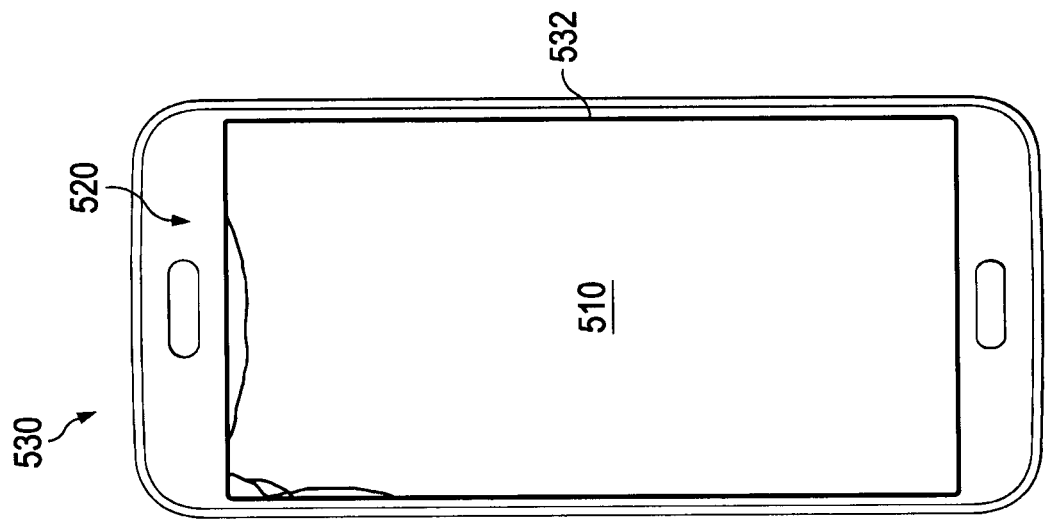
FIG. 5B illustrates an implementation of an example image.
Figure 5A:
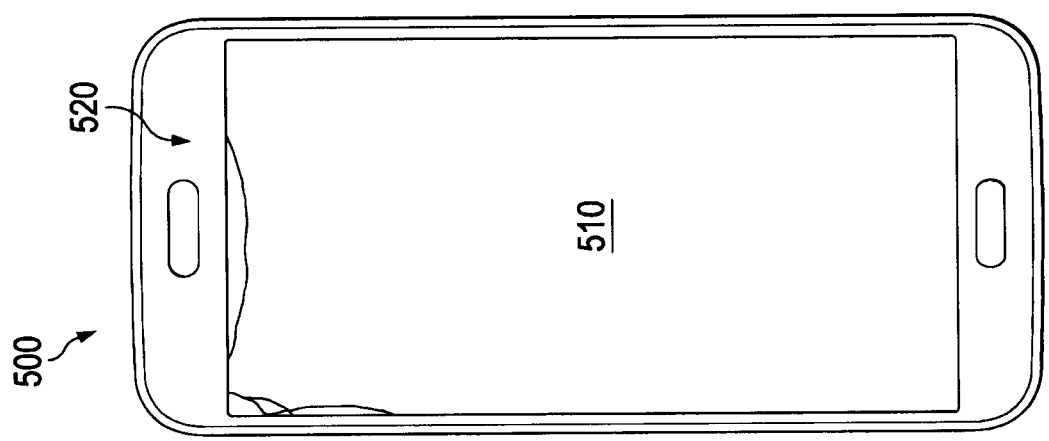
FIG. 5A illustrates an implementation of an example image.
Figure 6B:
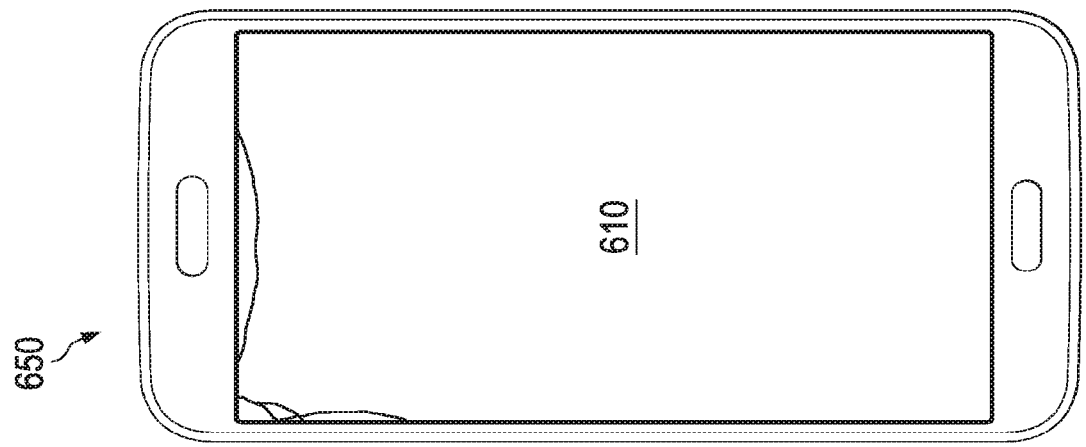
FIG. 6B illustrates an implementation of an example image after processing.

The image may be processed by the server. A selected portion of the received image may be identified (operation 420). For example, the image captured by the return application may include the device screen and an area proximate the device screen. A selected portion of the image, such as the device screen and/or active portion of the device screen (e.g., lit portion and/or portion that responds to touch), may be identified. In some implementations, a selected portion of the received image may be selected to reduce the size of the image to the portion relevant to the analysis of the condition of the device screen (e.g., an analysis of the area proximate the device may not indicate if a screen is damaged). FIG. 5A illustrates an implementation of an example image 500 that includes a device screen 510. As illustrated, the image includes the device screen 510 and an area proximate the device screen 520. The device screen 510 may be detected using corner detection 535, as illustrated in the image 530 in FIG. 5B. FIG. 6B illustrates an implementation of an example image 600 that includes a device screen 610. As illustrated the image is includes the device screen 510 and an area proximate the device 620. The components of the device can be identified in the image using edge detection of the edges 630 of the device in the image, in some implementations. As illustrated, the device screen 610, microphone, speaker, and case can be identified in the image. Identification of one or more components may facilitate determination of the condition of the device screen outside of the active area of the device screen and/or may facilitate identifier of damage to other components (e.g., a crack above microphone may indicate that the microphone is damaged also).

In some implementations, the image size may be altered (e.g., cropped or otherwise reduced) such that only the selected portion of the image is shown in the altered image. In some implementations, the selected portion of the received image may be labeled or otherwise identified in the image.

Figure 6A:
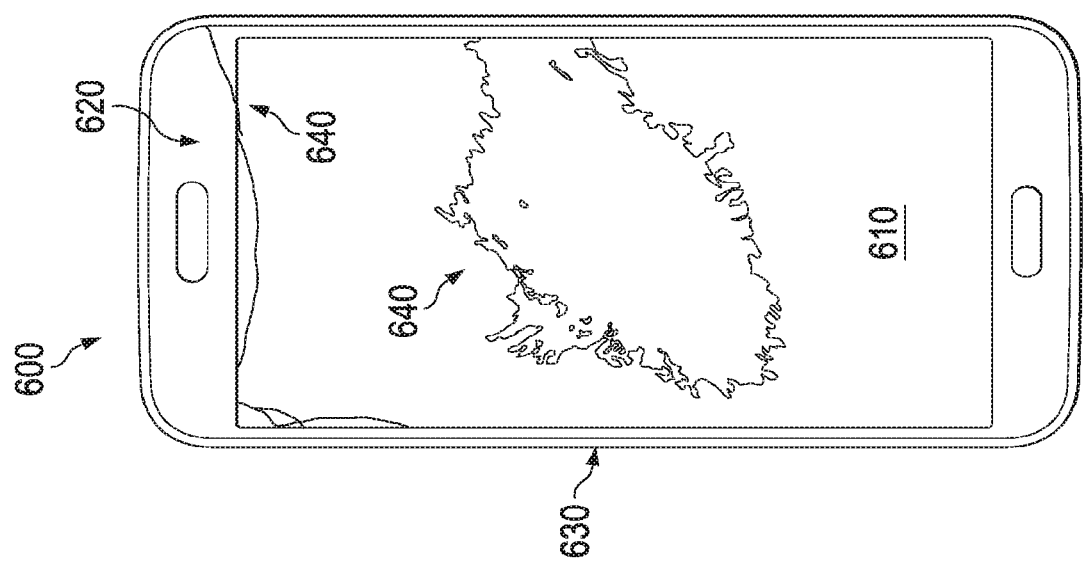
FIG. 6A illustrates an implementation of an example image prior to processing.

The selected portion of the image may be adjusted (operation 430). For example, the server may adjust the contrast, brightness, coloring, sharpness, exposure, bleeding, alignment, image translation, size, and/or other appropriate aspects of the image. In some implementations, noise may be reduced to facilitate identifier of screen damage, as opposed to markings that are more attributable to noise. FIG. 6A illustrates an implementation of an example image 600 that includes a device screen 610 before the image has been adjusted and FIG. 6B illustrates an example of an adjusted image 650. The adjusted image 650 reduced noise 640 in the device (e.g., lines, shading, and/or other features not attributable to damage of the screen).

The adjusted image may be divided into parts (operation 440). For example, the adjusted image may be divided into a plurality of parts. FIG. 7 illustrates an implementation of an example of an adjusted image that includes a device screen 710 and the resulting parts 720. The division may be by cropping the image into small parts, identifying regions of an image as parts, and/or otherwise dividing the image as appropriate. The processing of each part of the selected portion of the image may be more quickly processed by the server (e.g., the neural network of the server) than if the entire image was processed by the server. Thus, dividing the image may increase the speed at which the image or adjusted image is processed. For example, each part of the adjusted image may be analyzed by a node of the neural network. Thus, since each node is analyzing a discrete part of the image, the analysis may be performed faster than if the entire image was analyzed by a server. In some implementations, dividing the image into parts may increase the probability of a screen condition being detected and/or decrease the probability of a screen condition being falsely identified. For example, since screen damage may extend into more than one part of an image, identifier of a high probability of screen damage in one or more adjacent parts may increase the probability of screen damage in a first part. In some implementations, the size and/or shape of the damage and whether an adjacent part includes a predetermined probability of damage may be analyzed to determine if the part and thus the device includes damage. For example, selected shapes and/or sizes of cracks may be known to extend across multiple adjacent parts, and if multiple adjacent parts do not include a predetermined probability of damage, the overall probability of screen damage may be decreased. As another example, some selected shapes and/or sizes of chips may not extend across multiple adjacent parts of the image, and the lack of a predetermined probability of damage in the adjacent parts may not adjust the overall probability of screen damage.

A determination of whether one or more part(s) of the image shows damage may be made (operation 450). For example, the server may analyze the part to determine if screen damage is present (e.g., crack, dent, chip, pixel damage, etc.). The neural network of the server may perform the analysis of one or more parts of the adjusted image based on patterns and/or identifier techniques learned from previous device screen images and/or a set of known screen images (e.g., known to have or not have screen damage). In some implementations, allowing the parts to be analyzed by the neural network of the server may allow easy upgrading and maintenance of the neural network and improve accuracy (e.g., since previous device screen images from a plurality of devices may have been analyzed).

A determination of whether the device screen is damaged may be made based on the determination of whether a part shows damage and/or whether an adjacent part shows damage (operation 460). If a determination is made that a part is damaged (e.g., binary decision such as yes or no damage; probability of damage exceeds predetermined probability, such as 50% probability of damage), the server may identify adjacent part(s). Whether one or more adjacent parts are damaged may be determined and may be utilized by the server (e.g., the neural network) to determine if the screen should be identified as damaged. For example, if one part has a probability of damage of 20% and 4 parts proximate have a probability of damage of 50%, a determination may be made that the screen is damaged. As another example if one part has a probability of damage of 50% and no parts proximate have a probability of damage greater than 25%, a determination may be made (e.g., by the server) that the screen is not damaged. In some implementations, the overall probability of damage to a device screen may not be decreased based on probabilities of damage in adjacent parts based on characteristics of the damage (e.g., location, size, and/or shape). In some implementations, as the neural network accuracy increases the predetermined range of probabilities associated with damaged screen(s) may be decreased. For example, the system may indicate that when a probability of screen damage is greater than 70% in a part, screen damage may be determined to exist; and, when the neural network accuracy increases, the system may indicate that when a probability of screen damage is greater than 50% in a part, screen damage may be determined to exist.

Notification(s) may be transmitted based on the determination of whether the device screen is damaged (operation 470). For example, if a determination is made that the screen is damaged or is not damaged, a user may receive a notification based on this determination. In some implementations, if a determination is made that the device screen is damaged, the user may be allowed to contest the determination by restarting one or more operations of the process (e.g., reposition device and/or retake images). In some implementations, a notification of whether the device screen is damaged and/or a price based on the condition of the device screen may be transmitted to the application for presentation to a user via the return application.

Notification(s) may be transmitted based on the determination that the neural network could not accurately assess the device screen's condition. For example, during image processing the server may identify the full screen was not in the image. The determination may be made by calculating expected screen aspect ratios, expected angle values of the screen, expected dimensions of a model, etc. The server may instruct the user through the return application to capture another image. The server may provide instruction to the user through the return application on the best way to position the device, in real time.

Process 400 may be implemented by various systems, such as system 100. In addition, various operations may be added, deleted, and/or modified. In some implementations, process 400 may be performed in combination with other processes such as process 200. For example, the condition of the device may be determined for resale of the device. Since a resale price and/or demand for a device on a resale market may be based at least partially on the condition of the device, automatically determining the condition of the device and/or components thereof may facilitate determining a price to offer for a device (e.g., that will be resold). In some implementations, the condition of the device may be determined to facilitate determining whether a device may be reused (e.g., by another user). The condition may be determined and the other user may determine a price to offer for the device, whether a device is capable of being reused, whether to use the device as is, and/or have the device repaired. In some implementations, the condition of the device may be determined for use with a device insurance policy. For example, if a user would like to obtain device insurance, the return application may be utilized to determine a condition of the device and/or components thereof. The condition of the device and/or a history of the condition of the device (e.g., multiple screen cracks that have been repaired) may be utilized to determine whether to offer a device insurance policy, a price to set for a device insurance policy, and/or to verify a condition of the device provided by the user. In some implementations, the user may want to submit an insurance claim and the condition of the device or components thereof may be determined by the return application to submit with the insurance claim and/or to verify parts of an insurance claim.

In some implementations, instead of and/or in place of the first graphic and/or identification code, an IMEI and/or other device and/or operating system specific code may be obtained and/or utilized to facilitate identification of a device For example, the IMEI and/or other code may be associated with the images of the screen captured via the second graphics to identify a specific device. A user may be guided (e.g., via prompts on a graphical user interface of the return application) to settings page of the device where the IMEI is displayed and/or the user may be prompted to dial codes on dialer to display the IMEI. The user may capture a screenshot of the IMEI (e.g., via the camera of the device and/or second device being used to capture images). The return app may process the screenshot (e.g., via OCR) to identify the IMEI. In some implementations, a user may install a profile from a server setup similar to an MDM server. The profile may provide the IMEI to the server. The server may pass the IMEI to the return application. In some implementations, the profile may reduce the number of steps a user performs to provide the IMEI to the return application. In some implementations, one or more of these capabilities may be automatically performed by the return application. The obtained IMEI may be utilized by the return app to tag captured images (e.g., second graphics) and/or ensure authenticity (e.g., via the obtained IMEI).

In some implementations, the condition of a first device may be determined using a second device. For example, a screen of a first device may be damaged such that a user may not be capable of using the device or may not desired to use the device (e.g., fingers may be harmed by cracks in screen, chips from screen are loose, screen may be further damaged by use, etc.). Thus, a second device may be utilized to capture the images of the first device. The first and the second device may include the return application (e.g., one or more operations of the return application may be performed by processors of the first device and second device). A request for evaluation of a condition of a screen of a first device or portion thereof via a return application on a second device may be received. The return applications on the first and second devices may be in communication (e.g., directly and/or indirectly via the return application on the server). For example, the return application on the second device may communicate with the return application on the first device to allow graphics to be presented on the screen of the first device via the return application. A first graphic may be presented on the screen of the first device via the return application on the first device, and the graphic may include a first identification code. At least a portion of the first graphic presented on the first device may be captured via a camera of the second device. The return application may have access to camera functions of a device, and thus a return application may be capable of allowing capture of a image. One or more second graphics may be presented on the screen of the first device (e.g., via the return application on the first device) and at least a portion of one or more of the second graphics presented on the first device may be captured via a camera of the second device. One or more of the second images may be pre-processed and/or processed to determine a condition of the screen of the first device. The image of the first graphic may be utilized to decode an identification code in the first graphic (e.g., to verify the identify of the first device). In some implementations, the identification code may include a code unique to the first device such as the IMEI number, which may be utilized by the return application to verify the identify of the first device and/or images captured from the screen of the first device.

In some implementations, the first graphic may or may not be presented and/or captured when utilizing a second device to determine a condition of a first device. A level of security and/or authentication provided by the return application capturing images on the device to be evaluated by return application may not be as strong as when a second device is utilized to capture the images from the first device, which is being analyzed. Thus, in some implementations, insurance claims, valuations, underwriting, and/or reimbursements may be adjusted to account for the increased risk in deceptive user operations.

In some implementations, processing a second image may include dividing the second image into parts; determining whether one or more of the parts of the second image include damage; identifying parts adjacent to one or more of the parts that include damage; and determining a condition of the screen of the first device based on whether one or more of the parts of the second image are determined to include damage and whether one or more of the parts adjacent to one of the parts determined to include damage also includes damage. The screen and/or portion thereof (active area) may or may not be identified from the second image prior to dividing the image into parts. For example, the neural network may be trained to identify damage in images even if the active area is not isolated, in some implementations.

In some implementations, one or more of the operations may be performed with one or more additional images. The determination of whether the device screen is damaged may be based on the analysis of the image and the additional images, in some implementations. In some implementations, the return application may process or at least partially process the image prior to transmitting the image to the server. In some implementations, the image may not be divided prior to analysis. In some implementations, the image may not be processed prior to analysis for screen condition. A determination of whether the device screen is damaged may be made based on the determination of whether a part shows damage even if an adjacent part does not show damage, in some implementations. For example, if a part shows 100% probability of damage and/or a deep crack, a determination may be made that the device screen is damaged. In some implementations, the return application captures the image, receives the image, and/or stores the image (e.g., instead of and/or in addition to the server). In some implementations, the return application may perform or more of the operations (e.g., instead of or in conjunction with the server).

In some implementations, a plurality of images may be utilized as the second graphics. For example, the return application may present and/or capture a set of second images. The set of second images may vary in coloring. The set of second images may be captured via burst of captures (e.g., automatically capturing a plurality of images in a short period of time as opposed to manually capturing the plurality of images). The burst of captures may use the same or different capture settings (e.g., flash, exposure, focal length, etc.). The return application (e.g., on the device and/or via the neural networks on the server) may compare one or more of the captured images to a predetermined reference color and/or image that include the predetermined reference color to identify a captured second image for processing (e.g., to determine a screen health). Images with poor image qualities such as coloring and/or blurriness may or may not be identified as captured second images, in some implementations.

In some implementations, one or more other automatic adjustments may be utilized to capture the images. For example, the capture burst may vary brightness, colors, orientation, focal length, etc. to obtain better consistency in images captured (e.g., to more accurately determine a condition of health since consistency in images may facilitate analysis by neural networks). For example, the brightness of the second image may be varied during the capture burst to provide a set of captured images. The images in the set may be compared to the reference color to identify captured second images for further processing (e.g., to determine a condition of the screen). In some implementations, the return application may prompt the user to reorient the device to obtain the set of captured images (e.g., to allow capture of images at different angles since multiple images may be taken to change perspective of crack which might not be visible in one angle).

In some implementations, obtaining multiple images captured in same session with different screen settings may increase crack visibility to the neural network (e.g., the images may highlight different types and/or positions of screen cracking). The return application may be utilized second graphics in different colors to facilitate identification of damaged screens. In some implementations, iii. Multiple tilt angles with UI to guide proper positioning.

In some implementations, the set of the captured images may be compared to reference images (e.g., color, intensity, etc.) to select which images to further process to determine a condition of a device. For example, the return application may select an image closest to brightness/color/intensity of images used for training to improve accuracy results. In some implementations, using operations of the return application, the color is taken over an area of the image known to be the screen. The color is matched to a reference color known to best display the crack visibility while minimizing the other defects such as reflections, bad color, etc. The image with the color closest to reference color is sent to neural network for processing. Image consistency improvement may make the analysis (e.g., performed by the neural network of the return application) less dependent on lighting conditions.

In some implementations, burst capturing of images may facilitate capture of one or more images (e.g., with the same or different graphics), in which the luminosity levels are not the same. One or more of the colors in the image may then be matched to a reference color to identify the captured image (e.g., from the set of burst captured images) that is the closest to the reference color. Utilizing burst capture with different luminosity levels may allow more consistency and/or reduce variability in the image capturing process and/or captured images sent to the neural network for analysis. This may reduce errors in analysis, in some implementations.

In some implementations, the capture of the first graphic may provide initial exposure setting(s). For example, the image of the first graphic may be obtained and analyzed to identify an initial exposure setting (e.g., if the images is too bright, blurry, etc.). Generating the initial exposure setting may improve image capture.

In various implementations, a condition of one or more screens of a device (e.g., electronic such as a mobile device, laptop, etc.) may be identified. The condition of the device may be determined using operations of the device and/or operations of other devices. For example, if a first device lacks a camera and/or lacks an operational camera, then a second device may be utilized to capture images of the first device or portions thereof (e.g., screen, front side, etc.). As another example, if components of the first device render the first device at least partially nonoperational (e.g., screen cracked such that use may harm a user and/or further damage the device, touchscreen does not work, stuck pixels interfere with use, etc.), then a second device may be utilized to capture images of the first device or portions thereof (e.g., screen, front side, back side, etc.).

In some implementations, a first device may be utilized to capture images of the first device by positioning the device such that an image of the device may be captured in a reflective surface, such as a mirror. Risks associated with fraud may be decreased by utilizing a device's own camera to capture images (e.g., such that images of similar devices are not presented instead). A request for evaluation of a condition of a component, such as a screen, of a first device or portion thereof may be received via a return application on the first device. The return application may reside on the first device and/or be accessible by the first device (e.g., stored remotely). The return application may present one or more graphical user interfaces to facilitate communication with a user and/or to present graphics on a screen of the device.

The return application may present one or more graphics on a screen of the first device (e.g., via a graphical user interface generated by the return application) for capture by the camera of the first device. For example, a first graphic may be generated and/or presented on a screen (e.g., display component) of the first device (e.g., by the return application). The first graphic may include one or more first identification codes such as a IMEI associated with the device, a coding number generated by the return application and associated with the device, a QR code, etc. The identification code may be analyzed (e.g., decoded, compared to a listing of codes, etc.) to verify the identity of the first device. At least a portion of a first image of the first graphic may be captured by the camera of the first device. The first image may include a reflection of the first graphic on a reflective surface, such as a mirror. The first graphic and/or the identification code of the first graphic may be tagged or otherwise embedded in other captured images (e.g., second images that include second graphics). The first graphic may be utilized by the return application to determine initial settings (e.g., brightness, contrast, orientation, distance to reflective surface, etc.) to be used in presentation and/or capture of later graphics. In some implementations, the first graphic may not be utilized (e.g., generated and/or captured).

Other images may be generated and/or presented by the return application to facilitate identification of damage in the device or portion thereof (e.g., screen). One or more second graphics may be generated and/or presented (e.g., via graphical user interfaces of the return application) on the screen of the first device. The second graphics may include graphics configured to facilitate identification of damage (e.g. cracks, bruises, chips, etc.) by the return application (e.g., using a trained neural network). For example, the second graphics may include a solid color, varying color, pattern(s), images, etc. In some implementations, the second graphic may include a set of graphics in which the images displayed in the graphic change and/or settings used to present the second graphic on the screen change. For example, a luminosity of the presented image may be changed to present the same second graphic in different ways for capture. In some implementations, a single second graphic may be generated and/or presented (e.g., a green solid graphic). At least a portion of one or more of second images of at least one of the second graphics may be captured (e.g., via a camera of the first device). One or more of the second images may include a reflection of at least one of the second graphics on the reflective surface, such as a mirror. The captured image may include more than the screen (e.g., the front face, area proximate the device, etc.). The return application may be capable of controlling and/or allowing the user to control the camera component of the first device. The return application may have access to the images captured by the camera of the first device.

In some implementations, the captured images (e.g., first and/or second images captured) may be pre-processed. The pre-processing may be performed by the return application on the user device and/or on the sever (e.g., using the trained neural network). The pre-processing may identify poor quality images, for example, by identifying portions in the captured image that are not associated with the presented image and/or damage to the screen (e.g., obstructions, flash reflections, etc.). The pre-processing may identify partial images and/or blurry images. In some implementations, the determination by the return application in pre-processing that the captured image is of poor quality may cause the return application to reject the image and/or request recapture of the image. When recapturing the image, the return application may regenerate and/or present the graphics on the screen of the first device. The return application may modify the graphic, device settings, and/or prompt the user for adjustment in the recapture (e.g., restrict flash, adjust orientation, etc.). In some implementations, poor quality images may be processed to identify a condition of a component of the device.

One or more of the second images may be processed to determine a condition of a component, such as the screen, of the first device. Processing the second image(s) may include dividing the second image into parts and determining whether one or more of the parts of the second image include damage. The second image may be divided into parts to allow quicker processing (e.g., when compared to whole image processing) and improve accuracy (e.g., by allowing analysis of proximate regions in determining the probability of damage). In some implementations, parts adjacent to one or more of the parts that include damage may be identified as adjacent parts. The adjacent parts may or may not include damage.

A condition of the screen of the first device may be determined based on whether one or more of the parts of one or more of the second images are determined to include damage and whether one or more of the parts adjacent (e.g., a part proximate a specific part) to one of the parts determined to include damage also includes damage. For example, the neural network may be trained to identify common damage patterns and the information regarding adjacent parts (e.g., whether proximate parts are damaged and/or not damaged) may be used to determine if a part is damaged.

In some implementations, the determination of whether a component such as the screen of the first device is damaged may include additional damage information such as a rating (e.g., severity rating, type of damage rating, etc.), location of damage, etc. The additional damage information and/or the determination of whether the component of the device is damaged may be presented to the user and/or utilized in other operations of the return application (e.g., to reduce valuation, for insurance claims, warranty claims, etc.).

The described processes may be implemented by various systems, such as system 100. In addition, various operations may be added, deleted, and/or modified. In some implementations, processes or portions thereof may be performed in combination with operations from other processes such as process 200 and/or 400. For example, the capturing of second images may include a burst capture of second images. The device settings may be altered as a burst captures are allowed. The captured images may be compared with a reference image to identify which of the set of captured images to process. For example, an image with the closest color to a reference color may be selected (e.g., brightness and/or contrast may be adjusted on the device to obtain different colors in the second image as the burst of image captures occurs). The set of captured images may be pre-processed to identify which images may be processed. As another example, processing the captured second image may include generation of a third image in which portions of the image that are not associated with the screen of the device are removed from the image (e.g., cropped). This third image may be analyzed by at least portions of the neural network (e.g., divided into parts and/or analyzed) to identify whether the screen is damaged. In some implementations, poor quality images may be processed to identify a condition of a component of a device. For example, a blurry image may be processed and the neural network may account for the blurriness of the image in the analysis (e.g., by reducing the sensitivity of the damage detection to avoid over identification of damage).

In some implementations, one or more of the operations may be performed by a second device to obtain a condition of a first device. For example, the second device may include a camera to capture images presented on the first device by the return application. The return application on the second device may allow the capture of the images and/or coordinate presentation of the images on the first device, processing (e.g., pre-processing and/or processing) of the captured images, and/or identification of a condition of the first device. In some implementations, the increased change of fraud associated with capturing images using a different device than the device, of which a condition is being determined, may be accounted for in insurance underwriting, security measures (e.g., physical inspection upon receipt of the device for trade-in, sale, and/or return), and/or discounts (e.g., reduction in determined value and/or sales price).

In some implementations, the capture of images may be at least partially automated. When the image satisfies the initial exposure settings, the image may be obtained. For example, a user may move a phone and when the phone is in the optimum position (e.g., satisfies the initial exposure settings), the image may be automatically captured. The initial exposure setting may include criteria related to placement of the camera relative to the screen and/or mirror, the tilt angle, flash settings, brightness settings, etc. In some implementations, an initial exposure setting's phone screen brightness may be calibrated prior to positioning the phone identification code. In some implementations, brightness may be adjusted during calibration duration with different brightness and exposure settings. Brightness where a predetermined visibility of an identification code, such as a QR code, may be selected as reference brightness in current lighting conditions. This reference brightness may be used as median value for multiple image capture with different brightness, in some implementations.

In some implementations, the captured images may be processed by the neural network at full resolution or a lower resolution. The image sent to different levels may or may not vary. For example, the captured images may be passed through at all levels of the neural network at full resolution and remain a PNG file. In some implementations, when the image is sent to a first level of the neural network, the image may be reduced (e.g., to 128×256). The down sampled image may be sent to one or more of the layers of the neural network as an array of intensities of color. For example, Byte(red) Byte(green) Byte(blue), Byte(red), Byte(green), Byte(blue) would be 2 pixels of pixel (0,0) and pixel (0,1). In some implementations, the first layer of the neural network may be a pre-processing (e.g., return that the image is of poor quality and unprocessable and/or the image is processable). In some implementations, when the captured image is sent to the final layer, the captured image may be sampled by a patch and a slide (e.g., Patch may be 32 such that the tiles are 32×32, and slide may be 17 such that the network takes a tile from 1,1 and then the next tile is taken from 1, 17; and/or any other appropriate patch and/or slide). There may or may not be an overlap for the tiles being sent into the inner layers of the neural network. The sample (e.g., a 32×32 tile) may be sent into a final neural network layer as an array of RGB byte values that represent the color intensities. In some implementations, this may be done lengthwise and/or widthwise. The neural network may start at any appropriate point of the captured image. In some implementations, starting in approximately the middle may have a speed advantage in processing since the screen is in the center of the image and the edges contain background which may be ignored.

In some implementations, pre-processing may identify if the captured image is of poor quality. The pre-processing may be performed by the neural network (e.g., the first layer of the neural network), in some implementations. For example, the neural network may identify poor image such as grainy image; blurry image; bad contrast (e.g., dark); bad color (e.g., brightness); mismatched image (e.g., not a phone when expecting a phone); obstructions such as fingers, phone cases; partial screens, etc.

In some implementations, the return application (e.g., neural network of the return application) may identify a condition of a device or portion thereof as damaged or undamaged. The return application may identify the type of damage, severity of damage, etc. For example, the neural network may be trained to identify the type of damage and/or severity of damage. The neural network may rate the severity of the damage. For example, the output of the neural network may provide details about the condition such as cracked, bruised, stuck pixel, minor defect, good, etc. In some implementations, the condition and/or output of the neural network may be provided in an output format, such as but not limited to a simple integer 0–x, binary 000001, and/or percentages that sum to 1.0.

In some implementations, the neural network may have zero levels (e.g., before the processing). In some implementations, processing may be facilitated and/or accuracy may be improved by utilizing a neural network with more than one level (e.g., including the final processing layer). The return application may be customized based on desired parameters. For example, identifying blurry images may be easier and/or faster than determining an obstruction and thus a return application that only preprocesses for identifying blurred images may have less layers than a return application that preprocesses for obstructions and/or other poor image qualities. In some implementations, the guidance provided by the return application may allow better image capture and a single layer (e.g., final layer) neural network may be utilized to identify defects.

In some implementations, the return application may process poor quality captured images. For example, rather than excluding images based on color and/or blur a rating and/or color intensities for parts may be processed by the return application. The return application may or may not inhibit processing of other parts. For example, a rating may be a value, color and/or other indication, such as rating of 0 may indicate the image is not blurry and a rating 255 may indicate this image is very blurry. The rating scale may be linear or nonlinear. The return application (e.g., neural network) may adjust (e.g., increase and/or decrease sensitivity) based on the rating. For example, the return application may decrease sensitivity/aggressiveness when identifying cracks in a rating 255 captured image. Thus, a range of defective images may be processed and/or may be approximately accurately processed based on lower quality images.

In some implementations, other portions of the device may be captured and/or processed by the return application as described. For example, the return application may facilitate assessment of cracks on the mobile phone casing (e.g., front and/or back).

In some implementations, the determination of whether the device screen is damaged may be a determination of a degree of damage, whether the damage associated with one or more categories of damage (e.g., perfect, cracked, scratched, reflection), the probability that the damage exists, and/or any other appropriate categorization of the damage. For example, the determination of whether the device screen is damaged may be a determination that the screen is cracked or not cracked. In some implementations, the determination may yield a result between −1 and 1, for example, where values less than 0 are associated with not cracked device screens and values greater than 0 are associated with cracked device screens. For example, in some implementations, the value may be associated with the probability that the device screen is damaged and a device screen may be identified as damaged or cracked if the probability is greater than a predetermined value. For example, if there is greater than 90% certainty that the device screen is cracked (e.g., >0.80), the device and/or device screen may be identified as cracked. In some implementations, the analysis may be performed for each part, a set of adjacent parts, all the device parts, and/or the device overall.

In some implementations, the location, extent of damage to device screen (e.g., how deep, in which layer(s), etc.), and/or whether the damage affects other components may be determined (e.g., by the neural network of the system). For example, since the damage may be detected in discrete parts, in some implementations, the approximate location of the damage may be determined and/or transmitted to the user. In some implementations, the location of the damage may adjust the base price offered for the device. For example, a small crack in the screen that is not in the active area of the device screen may lower a price less than a crack in the active area of the device screen. In some implementations, the user may be notified of the location of the screen damage. The information may assist users in determining if the screen damage identified is actually screen damage or a mark on the device that can be removed. In some implementations, the extent of the damage may be determined to facilitate identification of whether the screen is repairable or if replacement is more appropriate (e.g., when repairing a device).

Figure 8B:
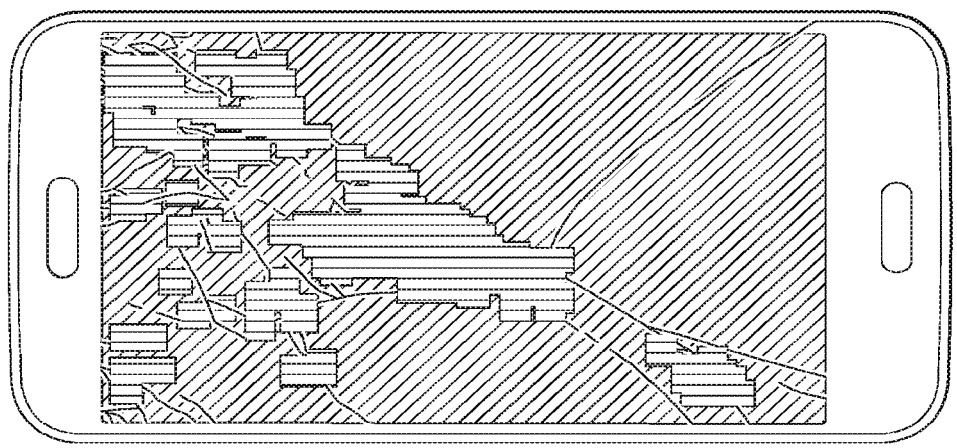
FIG. 8B illustrates an implementation of an interface generated as a result of a determination of whether the device screen illustrated in FIG. 8A is damaged.
Figure 8A:
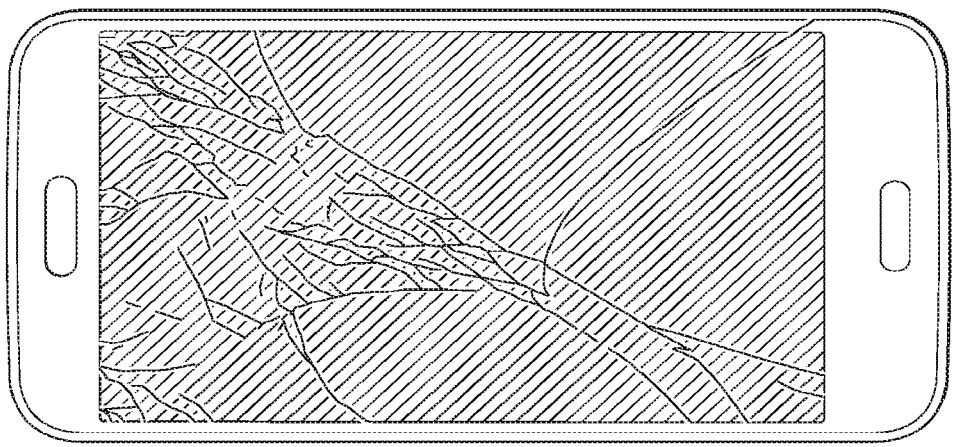
FIG. 8A illustrates an implementation of an example captured image of a device screen.
Figure 8D:
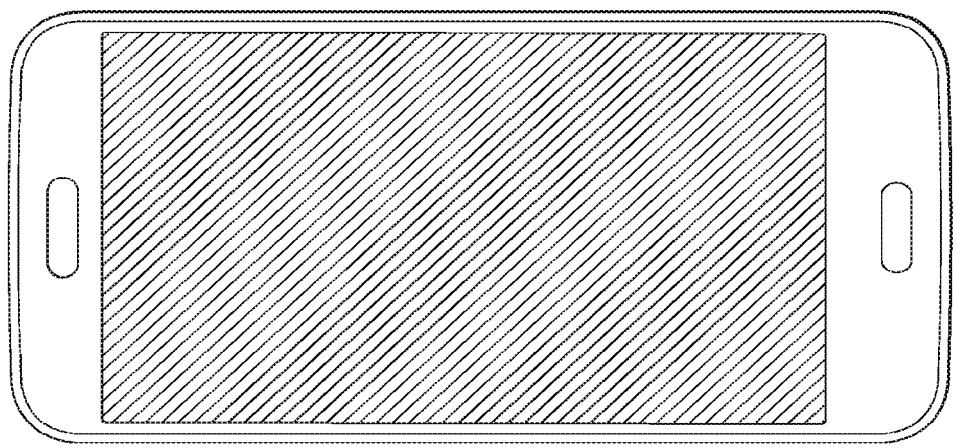
FIG. 8D illustrates an implementation of an interface generated as a result of a determination of whether the device screen illustrated in FIG. 8C is damaged.
Figure 8C:
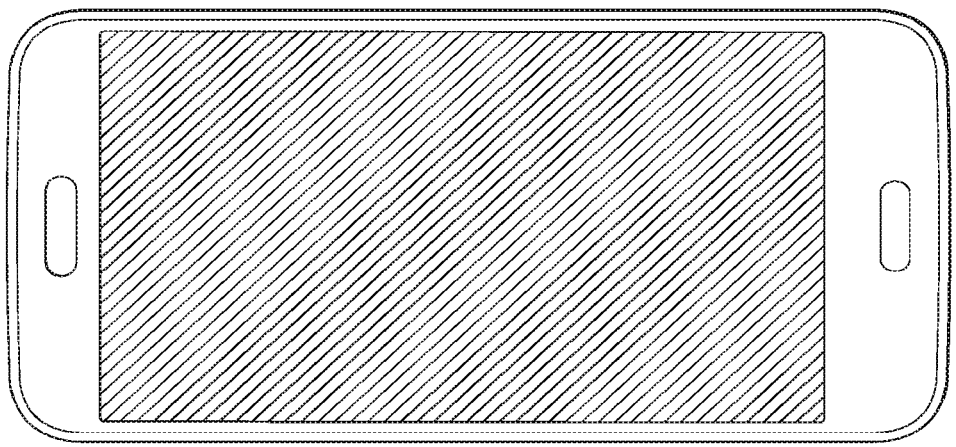
FIG. 8C illustrates an implementation of an example captured image of a device screen.
Figure 8F:
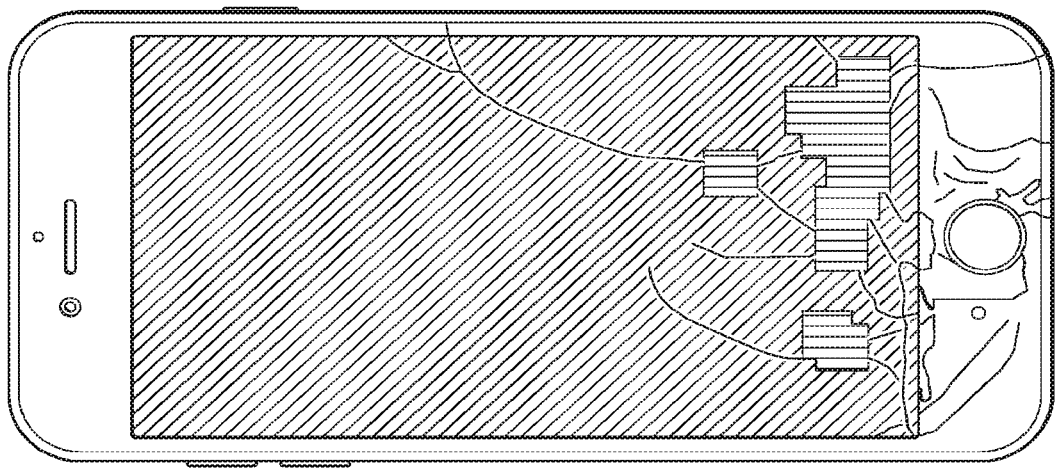
FIG. 8F illustrates an implementation of an interface generated as a result of a determination of whether the device screen illustrated in FIG. 8E is damaged.
Figure 8E:
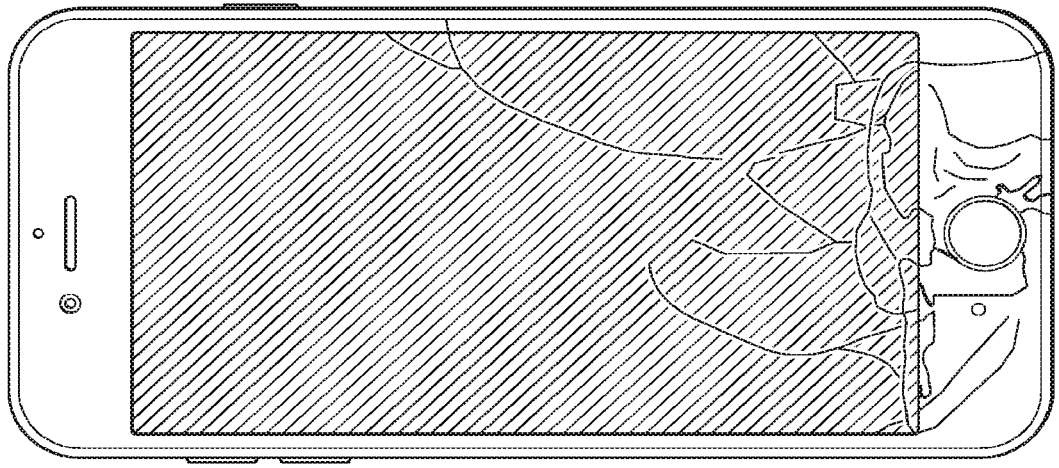
FIG. 8E illustrates an implementation of an example captured image of a device screen.

In some implementations, the location of parts of the device screen in which damage is detected may be flagged (e.g., different color, pattern, flags, and/or any other appropriate indicia). FIG. 8A illustrates an implementation of an example captured image of a device screen. As illustrated, the device screen includes cracks visible in the captured image. The captured image is divided into parts and analyzed to determine if one or more of the parts have a probability of damage greater than a predetermined probability. In some implementations, whether adjacent parts include damage may determine whether the device screen and/or parts thereof have damage. The system may identify parts with damage greater than a predetermined probability with a flag. FIG. 8B illustrates an implementation of an interface generated as a result of a determination of whether the device screen illustrated in FIG. 8A is damaged. The interface may be generated and presented to the user (e.g., via the return application and/or a website coupled to the server). As illustrated, the darker (e.g., red) flags indicate parts identified as damaged parts. The user may view the flags, contest flags that the user believes are not damaged parts of the device screen, and/or verify damaged parts. FIG. 8C illustrates an implementation of an example captured image of a device screen. As illustrated, the device screen is not damaged. Thus, when the image of the device screen is analyzed, no flags are generated. FIG. 8D illustrates an implementation of an interface generated as a result of a determination of whether the device screen illustrated in FIG. 8C is damaged. As illustrated, the automatic determination of the condition of the device screen did not find any damage and thus did not flag any parts of the device screen as damaged. As another example, FIG. 8E illustrates an implementation of an example captured image of a device screen. As illustrated the device screen includes damage. FIG. 8F illustrates an implementation of an interface generated as a result of a determination of whether the device screen illustrated in FIG. 8E is damaged. As a result of the determination of the condition of the device screen, the value app may flag portions of the device screen that are damaged. The darker flags (e.g., red flags) illustrate parts of the device that have been labeled as damaged by the system.

In various implementations, the determination of the condition of the device screen (e.g., whether the device screen is damaged or not damaged) may be used to determine a condition of the device and/or to further test a device (e.g., according to commonly used techniques and/or described techniques). For example, when a screen is cracked proximate a component of the device and/or when a crack has a size (e.g., depth and/or width) greater than a predetermined maximum size, further testing may be performed to determine if one or more other components (e.g., microphone, speaker, touch screen layer, and/or case) is damaged. For example, the operation of the component may be tested (e.g., automatically, semi-automatically, and/or manually). The condition of the device (e.g., the components including the screen), market data, current resale prices, and/or other information may be utilized to determine a price. The price may be transmitted to the user and/or displayed via the return application. The user may sell the device based on the offered price on the return application, in some implementations.

In some implementations, if a determination is made that a device screen is damaged, a touchscreen test may be performed. The touchscreen test may be performed via the return application. For example, the return application may prompt a user to provide input based on instructions from the return application, and a determination may be made regarding the condition of the touchscreen (e.g., damaged or not damaged, location of damage, and/or extent of damage) based on the input provided by the user. The results of the touchscreen test may be utilized to determine the depth of the damage to the device screen and/or damage to one or more other components of the device.

In some implementations, a grade of a device may be based at least partially on the determination of whether the device screen is damaged; the location of damage on a screen if the damage exists; the size of the damage to the screen, if damage exists; whether one or more other components of the device are damaged, resale value; recycling/scrap value; and/or other appropriate criteria. For example, if the device does not have screen damage the device may receive a first grade. If the device has screen damage, a second grade, which is lower than the first grade, may be assigned to the device. If a device has screen damage and touchscreen damage, a third grade, lower than the second grade, may be assigned to the device. The grading of the device may be associated with the price the user is offered for sale of the device and/or the price at which the device will be resold (e.g., on the market, to a third party, etc.).

In some implementations, since the assessment of the damage to a device screen may be made less subjective (e.g., since the damage may be determined automatically) and/or more consistently (e.g., location and/or size), the overall assessment of a device may be more detailed and/or grading may be made over more possible levels. Since smaller differences between conditions of a device may be more consistently and quickly provided. For example, screen damage that does not overlap with active areas of a screen may be graded as a damaged screen but with a higher grading than a screen with damage in the active area of the screen.

In some implementations, the image(s) may be stored in a memory of the device and/or in a memory coupled to the device (e.g., cloud storage and/or memory of the server). The return application may manage the upload of the image to the server based on the device's network connection (e.g., LTE, Wi-Fi or other).

In some implementations, screen damage may be verified by a human (e.g., quality control operator) and this feedback may be provided to the neural network to increase accuracy and/or allow adjustments to the analysis provided by the neural network of the server.

Although screen condition has been described in terms of damage due to cracks, other damages, such as damage to pixels (e.g., broken, stuck, etc.), bruises, etc. may also be determined via the return application. For example, the application may cause one or more graphics to be displayed on the device screen and the image of the graphic on the device screen to be captured (e.g., via a camera on the device). For example, the graphic may include a single color presented on the screen, a graphic with a variety of colors, a graphic with pattern(s), and/or a graphic designed to facilitate identifier of screen damage. The color presented in the images may be analyzed (e.g., by the neural network of the server) to determine if one or more pixels is not presenting the color accurately. In some implementations, a k means may be used to recognize features with approximately the same color in the image. Thus, damage to pixels may be identified based at least partially on the analysis of the captured image(s).

Although implementations may include commercially available neural networks, in some implementations, the neural network may be a customized neural networks capable of learning patterns, recognizing cracks, assigning a probability of damage existing on a device, and/or other appropriate functions. In some implementations, the neural network may include a cloud based system accessible by the return application. In some implementations, the neural network may be stored and operable on the device.

Figure 9A:
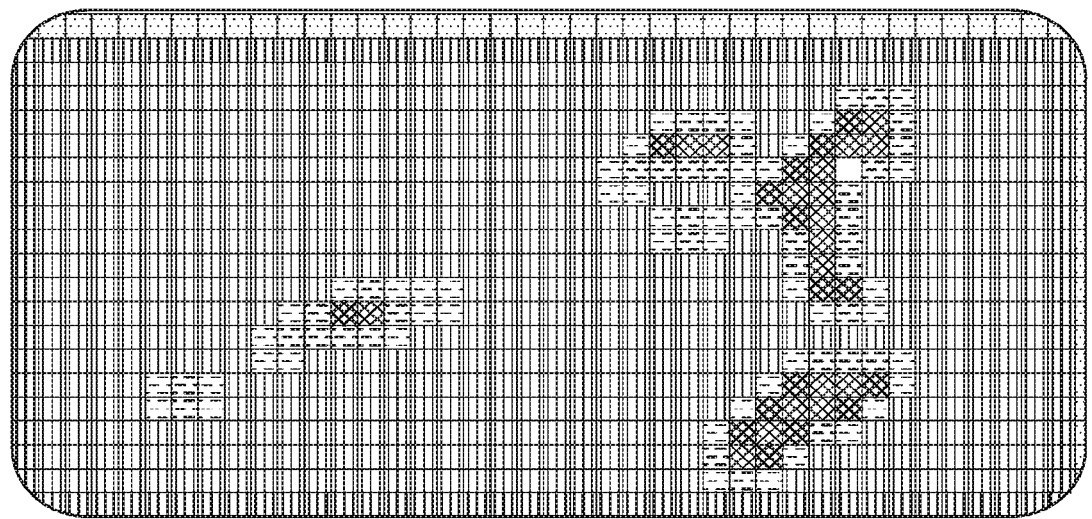
FIG. 9A illustrates an implementation of an example learning tool.
Figure 9B:
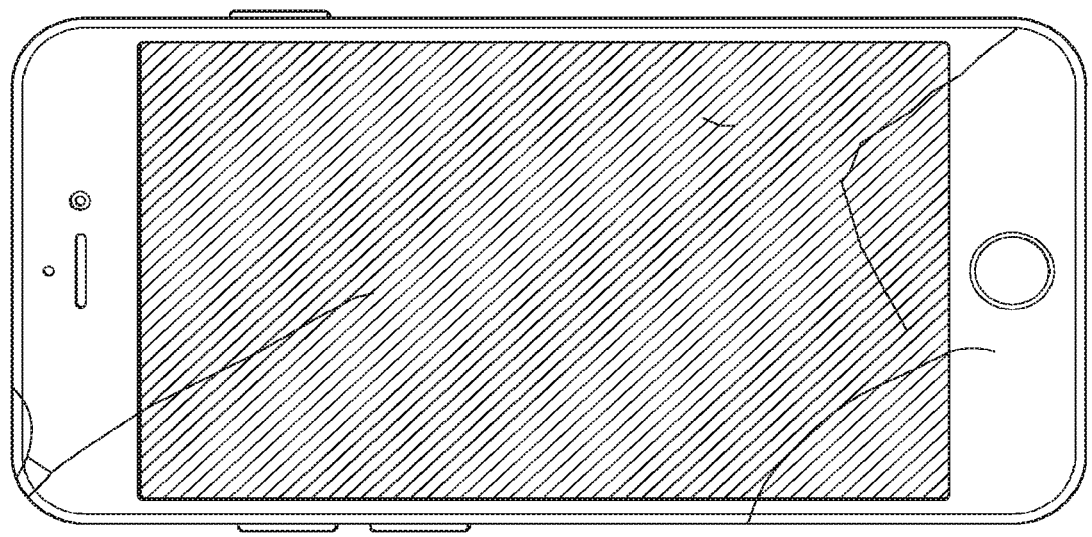
FIG. 9B illustrates an implementation of an example second image, from which the learning tool was obtained.
Figure 9C:
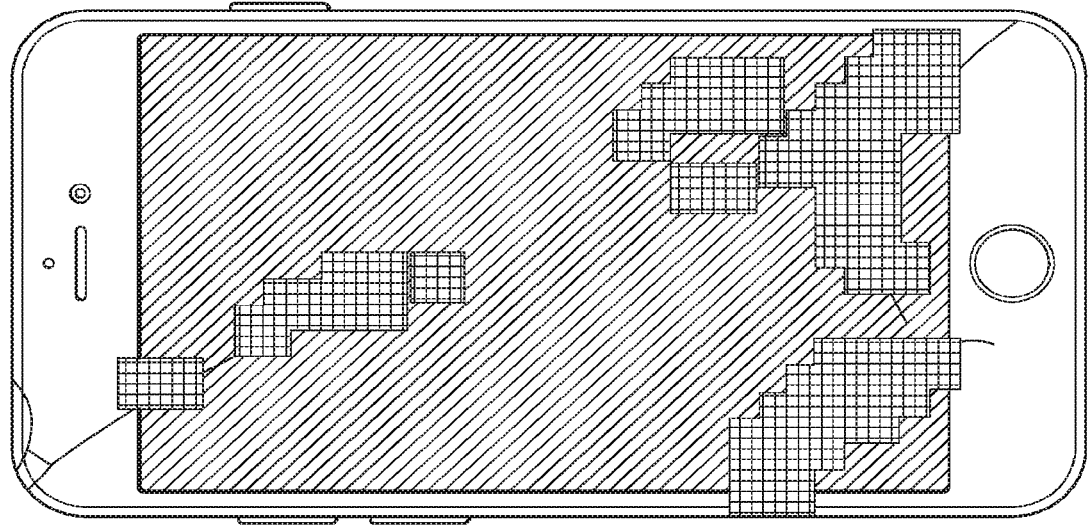
FIG. 9C illustrates an implementation of an example processing of the example second image illustrated in FIG. 9B.
Figure 10C:
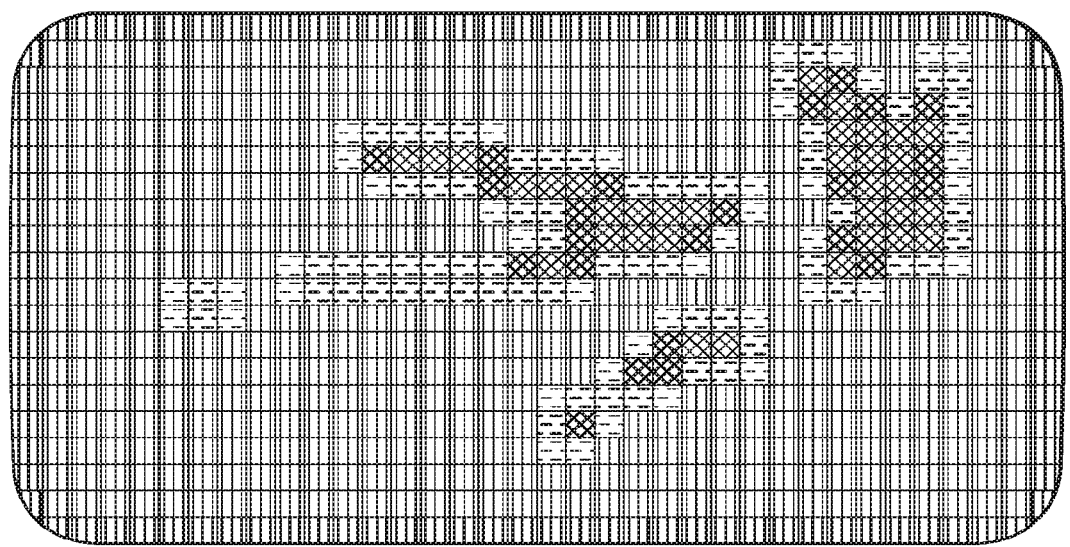
FIG. 10C illustrates an implementation of an example processing of the example second image illustrated in FIG. 10B.
Figure 10B:
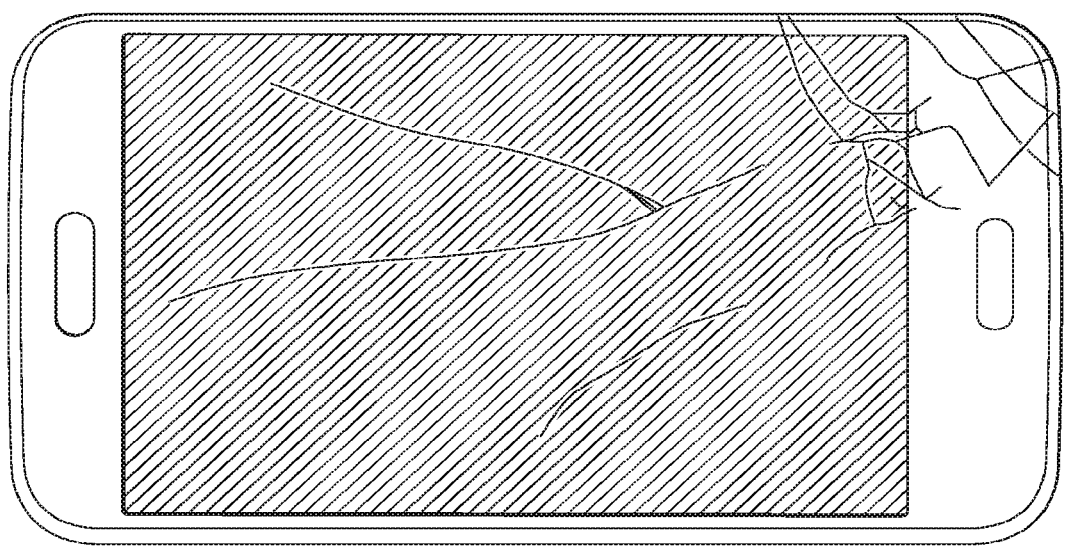
FIG. 10B illustrates an implementation of an example second image, from which the learning tool was obtained.
Figure 10A:
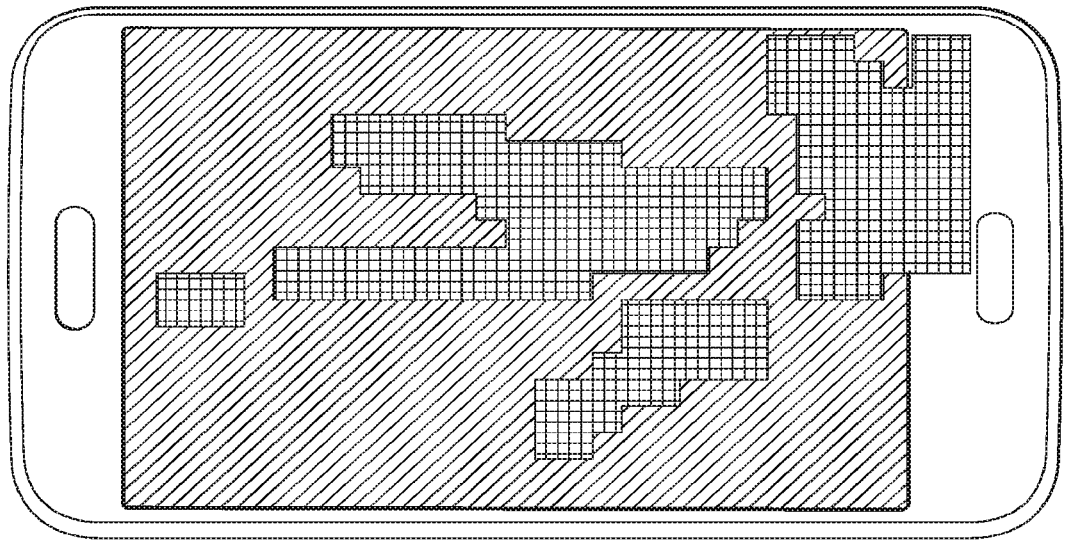
FIG. 10A illustrates an implementation of an example learning tool.
Figure 11C:
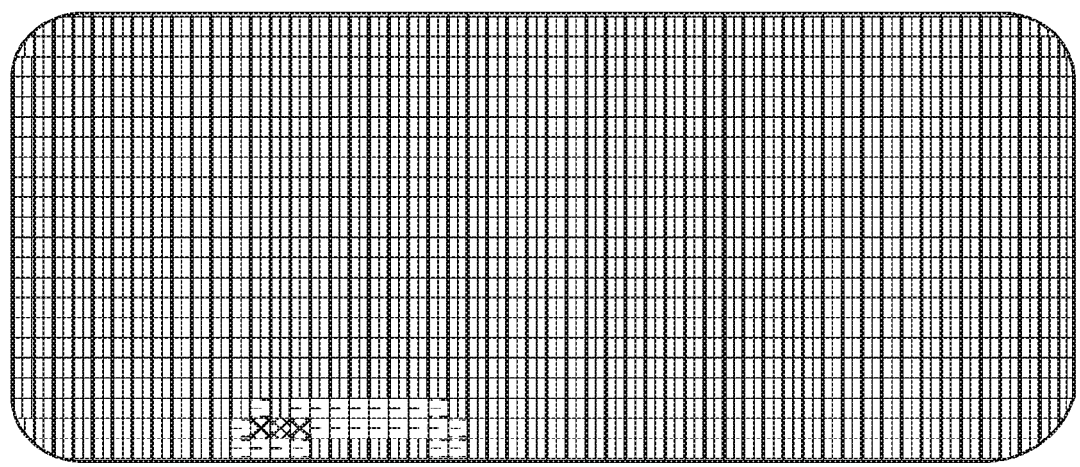
FIG. 11C illustrates an implementation of an example processing of the example second image illustrated in FIG. 9B.
Figure 11B:
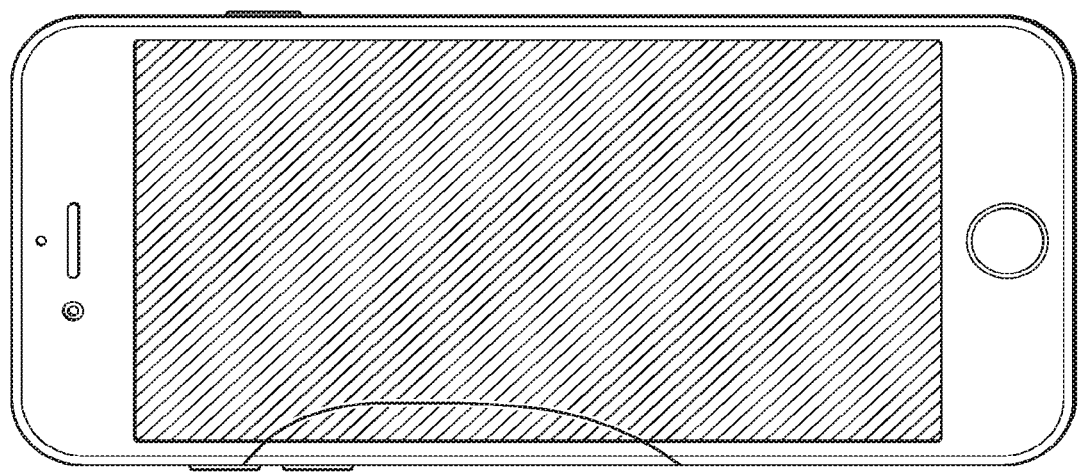
FIG. 11B illustrates an implementation of an example second image, from which the learning tool was obtained.
Figure 11A:
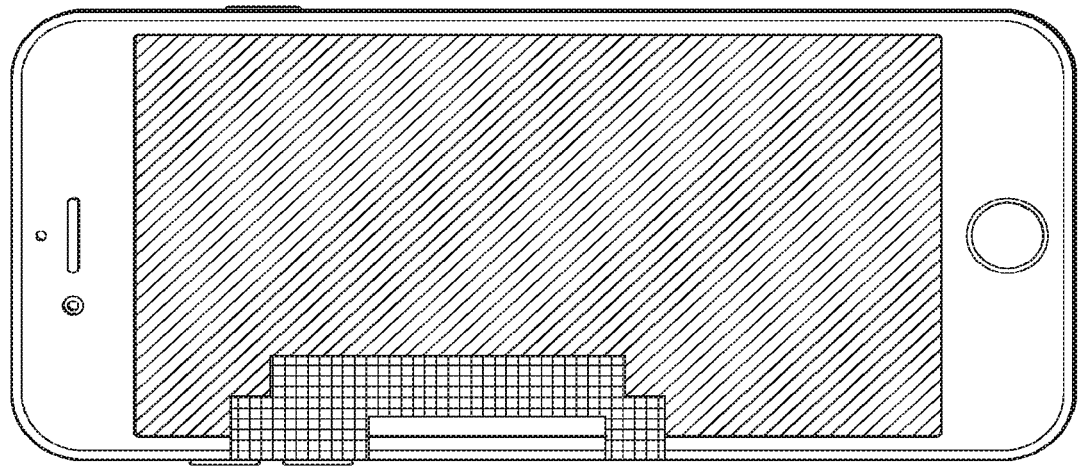
FIG. 11A illustrates an implementation of an example learning tool.
Figure 12A:
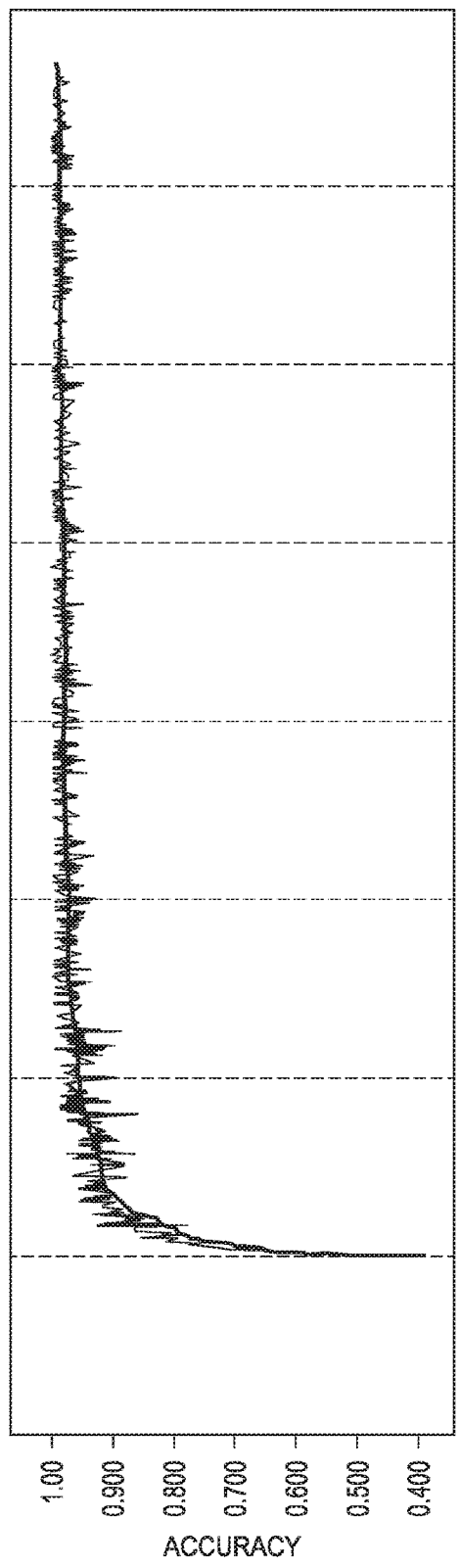
FIG. 12A illustrates an implementation of an example accuracy result for an example neural network.
Figure 12B:
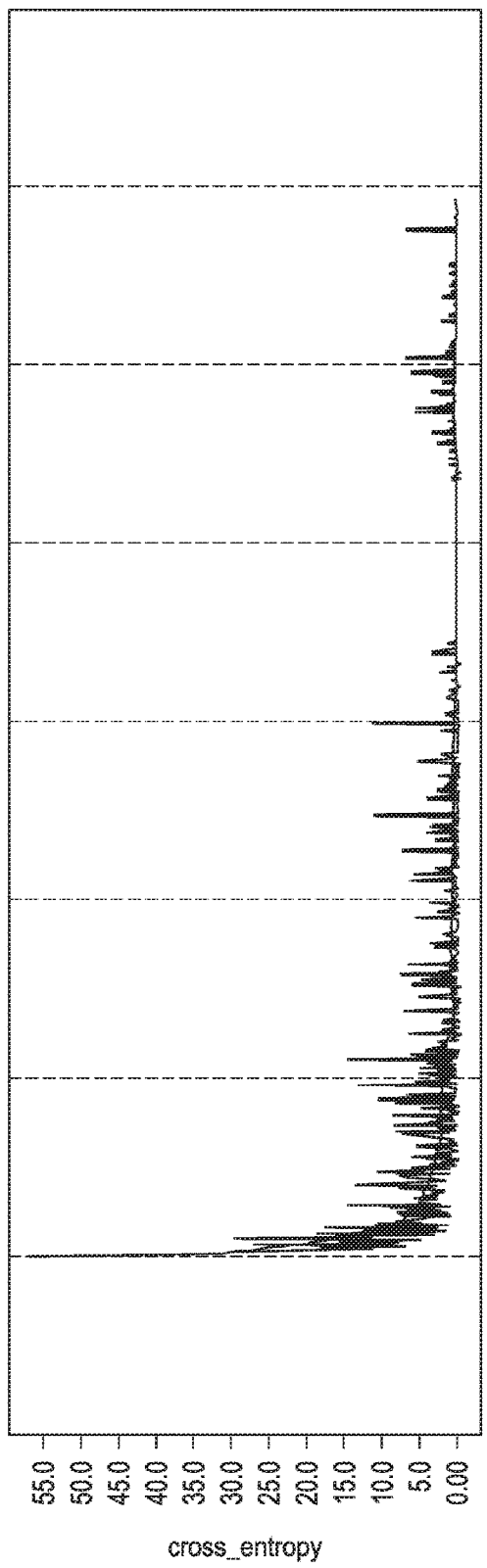
FIG. 12B illustrates an implementation of cross-entropy result for an example neural network.

In some implementations, the neural network may be trained using learning tools that allow the neural network to learn how to identify a condition of a screen of a device. FIGS. 9A, 10A, and 11A illustrate implementations of learning tools, and FIGS. 9B, 10B, and 11B illustrate associated second images. FIGS. 9C, 10C, and 11C illustrate examples of processing of the second images by the neural network, and FIGS. 12A-12B illustrate examples of the accuracy and cross-entropy achieved by the neural network. The neural network may include zero or more layers. In some implementations, the neural network may be multi-layered to facilitate processing and identification of a condition of a screen of a device from captured images. The neural network may be trained by providing example images such as the example captured images illustrated in FIGS. 9B-11B and corresponding example images in which the damage is identified, as illustrated in FIGS. 9A-11A. As illustrated in FIGS. 9B-11B, the damage is identified (e.g., by a different color and/or pattern). The neural network may process the example captured images, such as images 9B-11B according to one or more of the described operations. For example, the captured images may be divided into parts and a determination may be made by the neural network of which of the parts include damage. This result may be compared to the learning tools such that the neural network may learn and become more accurate, as illustrated in FIGS. 12A-12B.

Although mirrors have been described as providing the reflective surface to reflect the image presented on device screen, any reflective surface can be used instead of and/or in conjunction with a mirror. For example, a reflective piece of metal may be used to capture images of a device screen and/or a reflective piece of plastic.

Although users have been described as a human, a user may be a person, a group of people, a person or persons interacting with one or more computers, and/or a computer system (e.g., device, a robot).

In various implementations, a device has been described. The device may be any appropriate device, such as a smart phone, tablet, laptop, game console, portable media player (e.g., e-reader and/or video player), wearables (e.g., watches, jewelry, etc.), and/or video camera capable of executing the application and/or taking photos of the device. The device may include memory, a processor, and camera (e.g., component capable of capturing images). The device may store the return application on a memory and the processor may execute the return application to perform one or more of the described operations. In some implementations, the device may perform one or more of the operations described as performed by the server instead of or in conjunction with the server.

In various implementations, a server has been described. Server 110 may include a memory and a processor that executes instructions and manipulates data to perform operations of server. The server may be cloud-based and/or support cloud based processing and storing, in some implementations. As described, a neural network may be stored in a memory of the server and the processor may perform the functions of the neural network. The memory may include a repository (e.g., a database) of data. Data may include data for teaching and/or setting up the neural network (e.g., sets of images, feedback regarding correctly and/or incorrectly identified damage, patterns, etc.), resale prices, prices to offer for devices, screen repair and/or replacement costs, predetermined position for image capture information, market information, reuse information, insurance information, information to verify identify of devices, and/or any other appropriate information.

In addition, various software may be stored on memory of the server. For example, software may be capable of communicating with devices, performing one or more operations of determining condition of the device screen, performing tests on one or more components of the device, etc. In various implementations, one or more of the captured images may be stored on a memory of the device or server and/or transmitted (e.g., from a user device to server and/or vice versa.).

The software on the server and/or the return application may include a graphical interface facilitating interaction with a user. A communication interface may allow the server to communicate with other repositories and/or devices via a network. Communication interface may transmit data to and/or from server and/or received data from devices and/or coupled repositories and/or other computer systems via network protocols (e.g., TCP/IP, Bluetooth, and/or Wi-Fi) and/or a bus (e.g., serial, parallel, USB, and/or FireWire).

A graphical user interface (GUI) of the server and/or return application may be displayed on a presentation interface, such as a screen, of the device. The GUI may be operable to allow the user of device to interact with repositories and/or the server. Generally, GUI provides the user of the device with an efficient and user-friendly presentation of data provided by server and/or return application. The GUI may include a plurality of displays having interactive fields, pull-down lists, and buttons operated by the user. As an example, the GUI presents an explore-type interface and receives commands from the user. It should be understood that the term graphical user interface may be used in the singular or in the plural to describe one or more graphical user interfaces in each of the displays of a particular graphical user interface. Further, GUI contemplates any graphical user interface, such as a generic web browser, that processes information in server and/or device and efficiently presents the information to the user. In some implementations, GUI may present a web page embedding content from the return application and/or server. The server may accept data from the device via a web browser (e.g., Microsoft Internet Explorer or Safari) and return the appropriate Hyper Text Markup Language (HTML) or eXtensible Markup Language (XML) responses.

Although FIG. 1 provides one example of server that may be used with the disclosure, server can be implemented using computers other than servers, as well as a server pool. For example, server may include a general-purpose personal computer (PC) a Macintosh, a workstation, a UNIX-based computer, a server computer, or any other suitable device. According to one implementation, server may include a web server and/or cloud based server. Server may be adapted to execute any operating system including UNIX, Linux, Windows, or any other suitable operating system. In short, server may include software and/or hardware in any combination suitable to provide access to data and/or translate data to an appropriate compatible format.

Although implementations describe a single processor in servers and/or devices, multiple processors may be used according to particular needs, and reference to processor is meant to include multiple processors where appropriate. Processor may include a programmable logic device, a microprocessor, or any other appropriate device for manipulating information in a logical manner.

Although implementations discuss use of neural networks to perform at least a potion of the analysis of the return application, other computing device implemented analysis frameworks may be utilized, as appropriate. Implementations describe the neural network as being included on server(s) (e.g., physical servers and/or virtual servers), however, the neural network may be housed on other devices. For example, the neural network may be capable of running and/or at least partially running on user devices, such as a first device and/or second device such a mobile device. The neural network may be cloud based and accessed by the server and/or user devices (e.g., first and/or second device), in some implementations.

Although implementations describe a single memory of the server and/or devices, multiple memories may be used as appropriate. For example, a memory may include SQL databases, relational databases, object oriented databases, distributed databases, XML databases, cloud based memory, device memory, and/or web server repositories. Furthermore, memory may include one or more forms of memory such as volatile memory (e.g., RAM) or nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), and/or phase-change memory (PRAM).

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "an image" includes a combination of two or more images and reference to "a graphic" includes different types and/or combinations of graphics.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method to identify a condition of one or more screens of an electronic device, the method comprising:
   receiving, via a return application, a request for evaluation of a condition of at least a portion of a screen of the first device;
   causing, by the return application, display of a first graphic on the screen of the first device when the screen is turned on, wherein the first graphic comprises a first identification code;
   capturing at least a portion of a first image of the first graphic via a camera located in the first device, wherein the first image comprises a reflection of the first graphic on a reflective surface;
   causing, by the return application and responsive to analyzing at least the portion of the first image, display of one or more second graphics on the screen of the first device when the screen is turned on;
   capturing at least a portion of one or more of second images of at least one of the second graphics via the camera located in the first device, wherein each of the second images comprises a reflection of at least one of the second graphics on the reflective surface; and
   processing one or more of the second images to determine whether the screen of the first device comprises a crack.

2. The method of claim 1 further comprising verifying an identity of the first device based on an analysis of the first identification code.

3. The method of claim 1 wherein capturing at least a portion of one or more of second images of at least one of the second graphics comprises:
   determining an orientation of the first device based on the captured image of the first graphic; and
   providing guidance to adjust the orientation of the first device based on the determined orientation.

4. The method of claim 3 further comprising capturing at least a portion of an additional image of the first graphic via the camera of the first device.

5. The method of claim 3 further comprising:
   determining an orientation of the first device based on the captured first image of the first graphic;
   providing guidance to adjust the orientation of the first device based on the determined orientation; and
   capturing at least a portion of one or more of additional images of at least one of the second graphics via the camera of the first device, wherein each of the additional images comprises a reflection of at least one of the second graphics on the reflective surface.

6. The method of claim 3 further comprising determining that at least one of the captured first image or one or more of the captured second images is not a processable image; and allowing the first device to be reoriented to capture a processable image by:
   determining the orientation of the first device based on the captured first image or one or more of the captured second images; and
   providing guidance to adjust the orientation of the first device based on the determined orientation.

7. The method of claim 1 further comprising tagging one or more of the captured second images with at least a portion of the captured first image.

8. The method of claim 1 wherein identifying a screen or portion thereof of the first device in the second image comprises utilizing at least one of corner detection or edge detection to identify a screen of the first device in the second image.

9. The method of claim 1 wherein processing one of the second images comprises:
   identifying the screen or portion thereof of the first device in the second image;
   generating a third image in which portions of the second image that are not identified as a screen or portion thereof in the second image are restricted from inclusion in the third image;
dividing the third image into parts;
determining whether one or more of the parts of the third image include damage; and
identifying parts adjacent to one or more of the parts that include damage,
wherein determining the condition of the screen of the first device is based on whether one or more of the parts of one or more of the third images are determined to include damage and whether one or more of the adjacent parts includes damage.

10. The method of claim 9 wherein generating the third image comprises altering the second image such that portions of the second image that are not identified as the screen or portion thereof are removed.

11. The method of claim 9 wherein identifying the screen or portion thereof comprises identifying the active area of the screen of the first device.

12. The method of claim 1, wherein the return application executes on the first device.

13. The method of claim 1, wherein the return application is executed remotely from the first device and accessed using a web browser executing on the first device.

14. The method of claim 1, wherein processing one of the second images comprises:
dividing the second image into parts; and
determining whether one or more of the parts of the second image include damage.

15. The method of claim 14, wherein processing one of the second images further comprises:
identifying parts adjacent to one or more of the parts that include damage; and
determining a condition of the screen of the first device based on whether one or more of the parts of one or more of the second images are determined to include damage and whether one or more of the parts adjacent to one or more of the parts determined to include damage also includes damage.

16. A method to identify a condition of one or more screens of an electronic device, the method comprising:
receiving, via a return application of a second device, a request for evaluation of a condition of at least a portion of a screen of a first device or portion thereof;
causing, by the return application, display of a first graphic on the screen of the first device, wherein the first graphic comprises a first identification code when the screen is turned on;
capturing at least a portion of the first graphic presented on the first device via a camera of the second device to obtain a first image;
causing, by the return application and responsive to analyzing at least a portion of the first image, display presentation of one or more second graphics on the screen of the first device when the screen is turned on;
capturing at least a portion of one or more of the second graphics presented on the first device via the camera of the second device; and
processing one or more of the second images to determine whether of the screen of the first device comprises a crack.

17. The method of claim 16 further comprising if a determination is made that the condition of first device is damaged, determining damage information; and
generating flags to identify one or more of parts of the second image that are determined to include damage based on the determined damage information.

18. The method of claim 16 further comprising testing the screen of the first device if a determination is made that the condition of the first device is damaged.

19. The method of claim 16 further comprising calibrating brightness of the screen of the first device based on the captured first image.

20. The method of claim 16 wherein causing presentation of one or more of the second graphics on the screen of the first device comprises:
causing presentation of a set of burst images on the first device, wherein the set of burst images includes at least one of the second graphics at multiple luminosity levels, and
wherein capturing at least a portion of one or more of the second graphics presented on the first device comprises:
capturing the set of burst images presented on the first device;
selecting one of the captured burst images by determining which of the captured set of burst images is most similar in color to a reference color; and
identifying the selected captured burst image as one of the captured second graphics.

21. The method of claim 16 wherein capturing at least a portion of one or more of second images of at least one of the second graphics comprises:
determining an orientation of the first device based on the captured image of the first graphic;
providing guidance to adjust the orientation of the first device based on the determined orientation; and
capturing at least a portion of an additional image of the first graphic via the camera of the first device.

22. The method of claim 16 wherein causing display of one or more second graphics on the screen of the first device comprises causing sequential presentation of more than one second graphic on the screen of the first device, and wherein capturing at least a portion of one or more of the second graphics comprises capturing at least one image of each of the second graphics sequentially presented on the screen of the first device.

23. The method of claim 16 wherein causing display of one or more second graphics on the screen of the first device comprises causing concurrent presentation of more than one second graphic on the screen of the first device.

24. The method of claim 16, wherein the return application executes on the first device.

25. The method of claim 16, wherein the return application is executed remotely from the second device and accessed using a web browser executing on the second device.

26. The method of claim 16, wherein processing one of the second images comprises:
dividing the second image into parts; and
determining whether one or more of the parts of the second image include damage.

27. The method of claim 26, wherein processing one of the second images further comprises:
identifying parts adjacent to one or more of the parts that include damage; and
determining a condition of the screen of the first device based on whether one or more of the parts of the second image are determined to include damage and whether one or more of the parts adjacent to one or more of the parts determined to include damage also includes damage.

* * * * *

UNITED STATES PATENT AND TRADEMARK OFFICE
CERTIFICATE OF CORRECTION

PATENT NO. : 10,810,732 B2
APPLICATION NO. : 16/405583
DATED : October 20, 2020
INVENTOR(S) : Rajiv Kumar Dwivedi et al.

Page 1 of 1

It is certified that error appears in the above-identified patent and that said Letters Patent is hereby corrected as shown below:

In the Claims

Claim 16, Column 31, Line 60, the word "of", between the words "whether" and "the", should be removed.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*